United States Patent
Bouckaert

(10) Patent No.: US 9,429,300 B2
(45) Date of Patent: Aug. 30, 2016

(54) METHOD AND APPARATUS FOR SELECTIVE FILTERING OF AN ILLUMINATION DEVICE

(71) Applicant: The Boeing Company, Chicago, IL (US)

(72) Inventor: Anton M. Bouckaert, Simi Valley, CA (US)

(73) Assignee: THE BOEING COMPANY, Chicago, IL (US)

( * ) Notice: Subject to any disclaimer, the term of this patent is extended or adjusted under 35 U.S.C. 154(b) by 92 days.

(21) Appl. No.: 14/446,666

(22) Filed: Jul. 30, 2014

(65) Prior Publication Data

US 2014/0340905 A1 Nov. 20, 2014

Related U.S. Application Data

(62) Division of application No. 13/233,860, filed on Sep. 15, 2011, now Pat. No. 8,797,663.

(51) Int. Cl.
| | |
|---|---|
| *G02B 5/22* | (2006.01) |
| *G02B 7/00* | (2006.01) |
| *F21V 13/08* | (2006.01) |
| *G02B 7/02* | (2006.01) |
| *G02B 7/16* | (2006.01) |

(Continued)

(52) U.S. Cl.
CPC ............. *F21V 13/08* (2013.01); *F21V 14/06* (2013.01); *F21V 17/02* (2013.01); *G02B 3/0056* (2013.01); *G02B 7/021* (2013.01); *G02B 7/16* (2013.01); *G02B 26/008* (2013.01)

(58) Field of Classification Search
CPC ...... G02B 7/006; G02B 26/008; G02B 5/20; G02F 1/133514; G02F 5/20; F21V 13/08; F21V 9/08; F21V 14/08; F21V 9/00; F21V 17/02; F21V 29/74; F21V 29/75; F21V 14/06; F21V 17/00
USPC ..................... 359/889, 891, 892, 355–357
See application file for complete search history.

(56) References Cited

U.S. PATENT DOCUMENTS

| | | | | |
|---|---|---|---|---|
| 5,186,536 | A | * | 2/1993 | Bornhorst ............... F21S 10/02 362/281 |
| 5,695,272 | A | | 12/1997 | Snyder et al. |

(Continued)

OTHER PUBLICATIONS

Revue Thommen AG Product Presentation: Thommen HSL 1600 (Apr. 14, 2011).

(Continued)

*Primary Examiner* — Jade R Chwasz
(74) *Attorney, Agent, or Firm* — Thompson Hine LLP

(57) ABSTRACT

A filter for use with an illumination device of a type having a reflector with an exit opening and an illumination source mounted within the reflector, the reflector shaped to direct radiation emitted from the illumination source through the exit opening. The filter may include an outer support attached to a periphery of the exit opening; an inner support concentric with the outer support; a filter having a plurality of filter elements extending between and pivotally attached to the inner and the outer supports, the filter elements being shaped and positioned to substantially cover the exit opening to filter the emitted radiation passing through the exit opening when pivoted to a closed position, and to allow the emitted radiation to pass substantially unfiltered through the exit opening when pivoted to an open position; and an actuator connected to pivot the filter elements to the closed and open positions.

20 Claims, 27 Drawing Sheets

(51) Int. Cl.
*G02B 3/00* (2006.01)
*G02B 26/00* (2006.01)
*F21V 14/06* (2006.01)
*F21V 17/02* (2006.01)

(56) References Cited

U.S. PATENT DOCUMENTS

| | | | |
|---|---|---|---|
| 5,882,107 | A | 3/1999 | Bornhorst et al. |
| 6,068,385 | A | 5/2000 | Hsieh |
| 6,962,423 | B2 | 11/2005 | Hamilton et al. |
| 7,331,692 | B2 | 2/2008 | Baiardi et al. |
| 7,518,133 | B2 | 4/2009 | Giffen et al. |

OTHER PUBLICATIONS

Press Release, "Revue Thommen displays the HSL-1600 helicopter searchlight," http://www.shephard.co.uk/news/rotorhub/revue-thommen-displays-the-hsl-1600-helicopter-searchlight/8146/ (Jan. 20, 2011).
Press Release, "Revue Thommen Displays the HSL-1600 Helicopter Searchlight at ALEA in New Orleans," http://www.rotorpad.com/manufacturers/revue-thommen-displays-the-hsl-1600-helicopter-searclight-at-alea-in-new-orleans.html (Jul. 20, 2011).
"Signal lamp," 2 pages, http://en.wikipedia.org/wiki/Signal_lamp (Dec. 21, 2007).
"Instructions and Renewal Parts Model 24-G-20 24-Inch Searchlight Navy Department Contract NXs-4296," General Electric, Schenectady, NY, 47 pages, http://www.hnsa.org/doc/searchlight24/index.htm (Apr. 1944).
Web page featuring "HeliLight 1®," by Universal Searchlights, LLC, http://www.universalsearchlights.com/hellight.html (2009).
Product literature for "Trakkabeam®—M800," by Trakka Corp. Pty. Ltd., http://www.trakkacorp.com/tc/pdf/M800Brochure2006 (2009).
Product literature for "Trakkabeam®—M500," by Trakka Corp. Pty. Ltd., http://www.trakkacorp.com/tc/pdf/M500Brochure2006.pdf (2009).
Product literaure for Trakkabeam® A800, by Trakka Corp.Pty. Ltd., http.www.trakkacorp.com/tc/pdf/a800brochure2006.pdf, (2009).
Product literaure for Trakkabeam® A800, by Trakka Corp.Pty. Ltd., http//:www.trakkacorp.com.tc/pdf/A800Brochure2010_letter.pdf.
Chwasz, Jade R.; Non-Final Office Action; U.S. Appl. No. 13/233,860 (Aug. 28, 2013).
Chwasz, Jade R.; Final Office Action; U.S. Appl. No. 13/233,860 (Dec. 11, 2013).
Chwasz, Jade R.; Notice of Allowance; U.S. Appl. No. 13/233,860 (Mar. 31, 2014).

\* cited by examiner

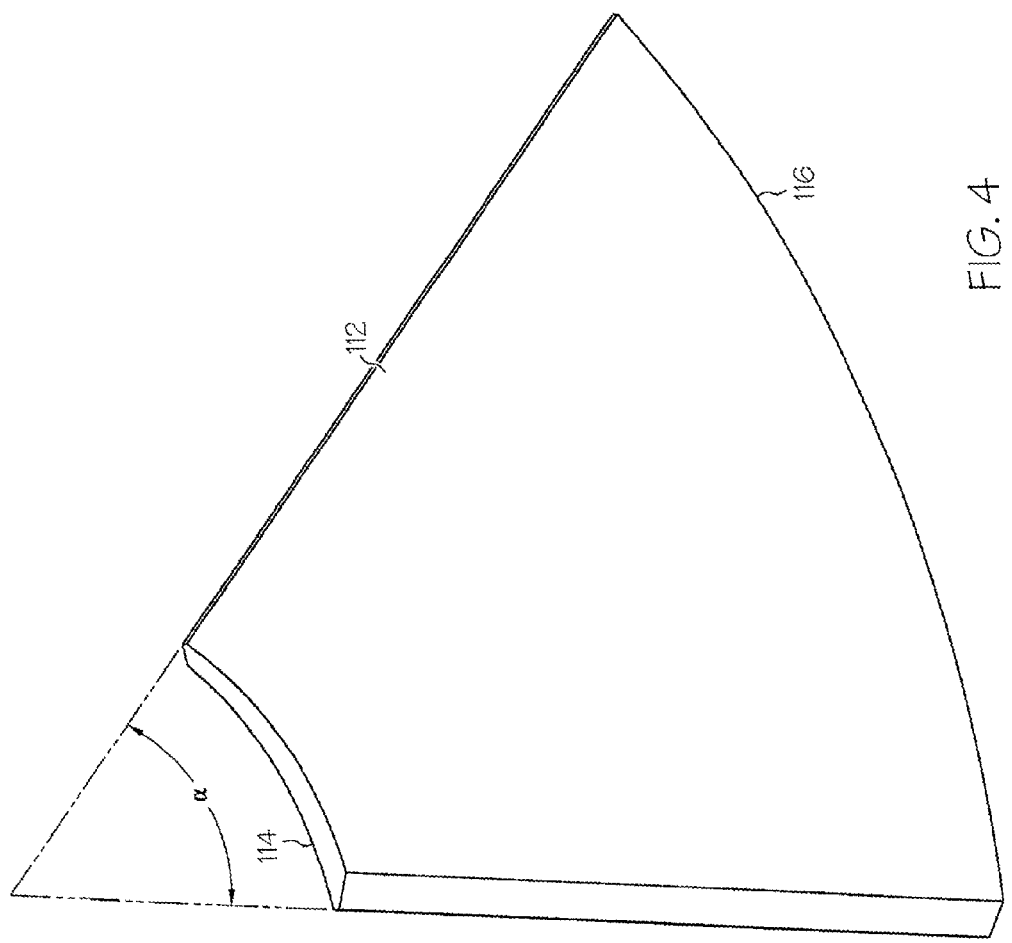

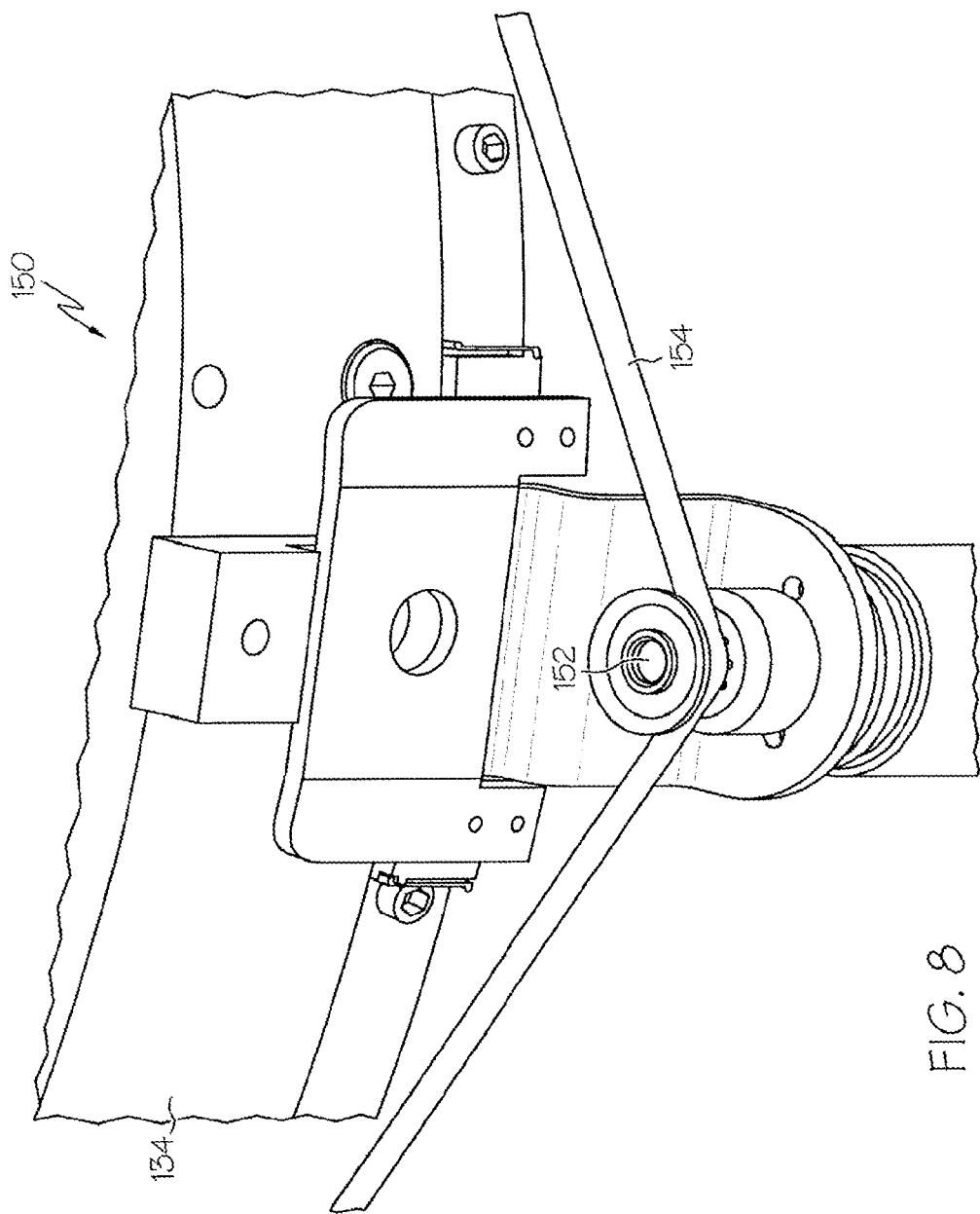

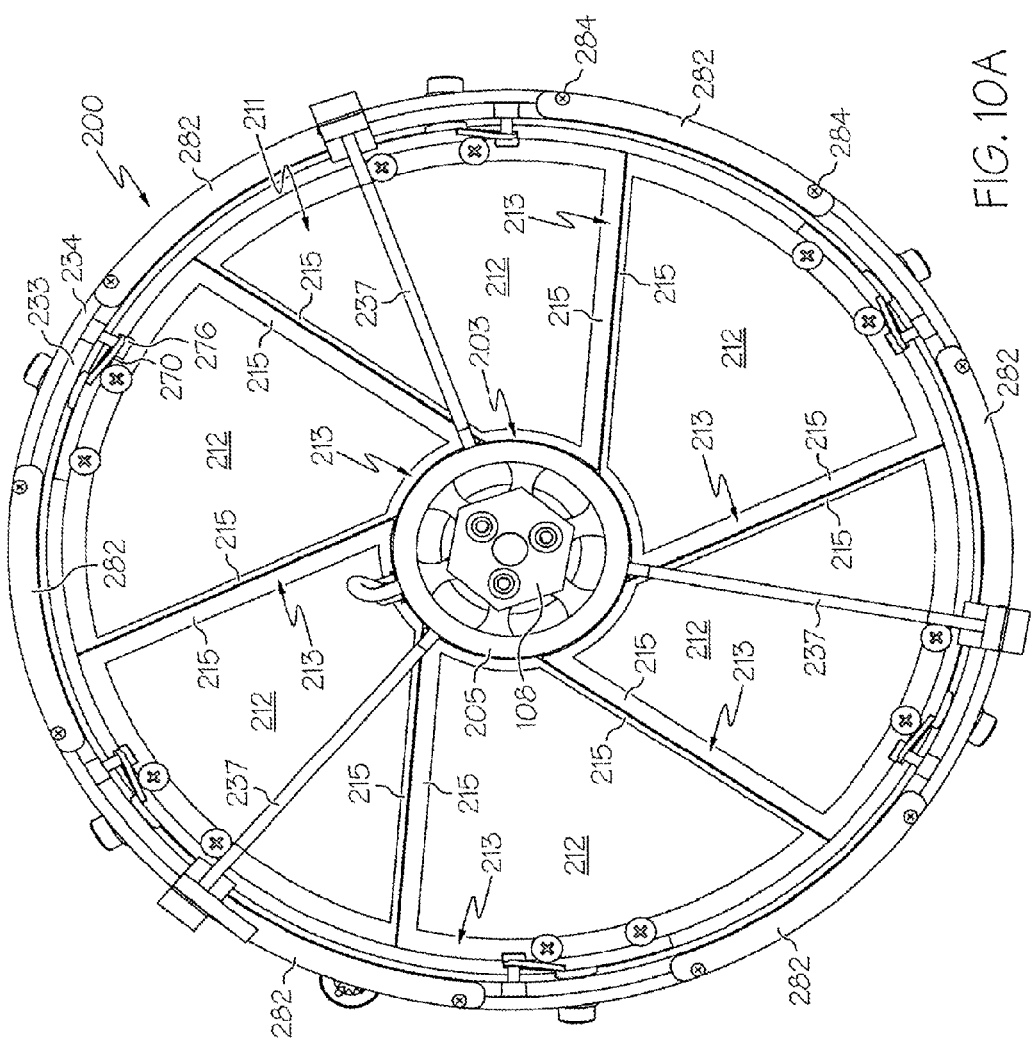

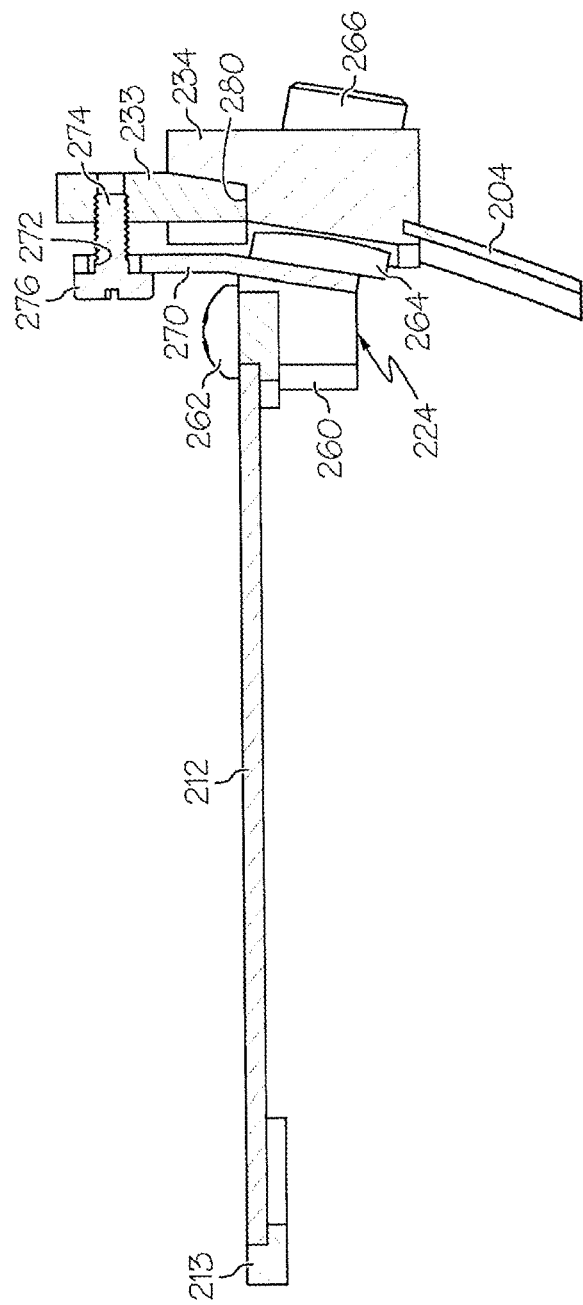

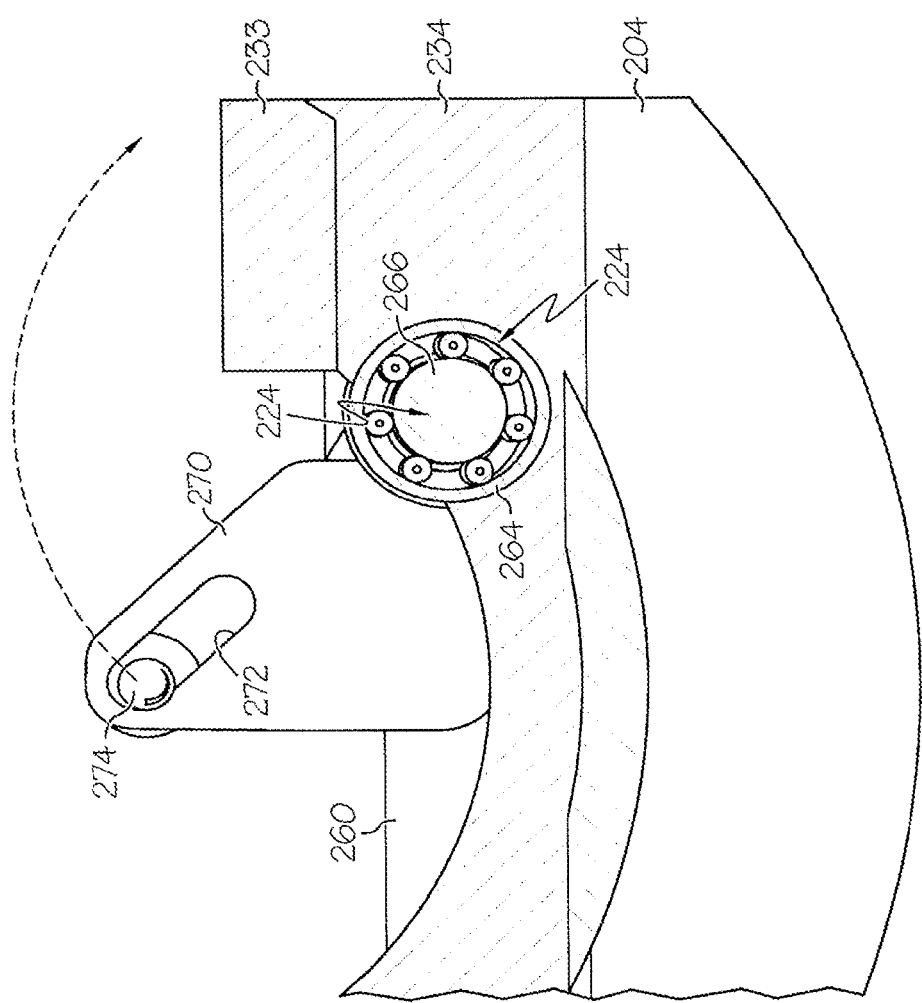

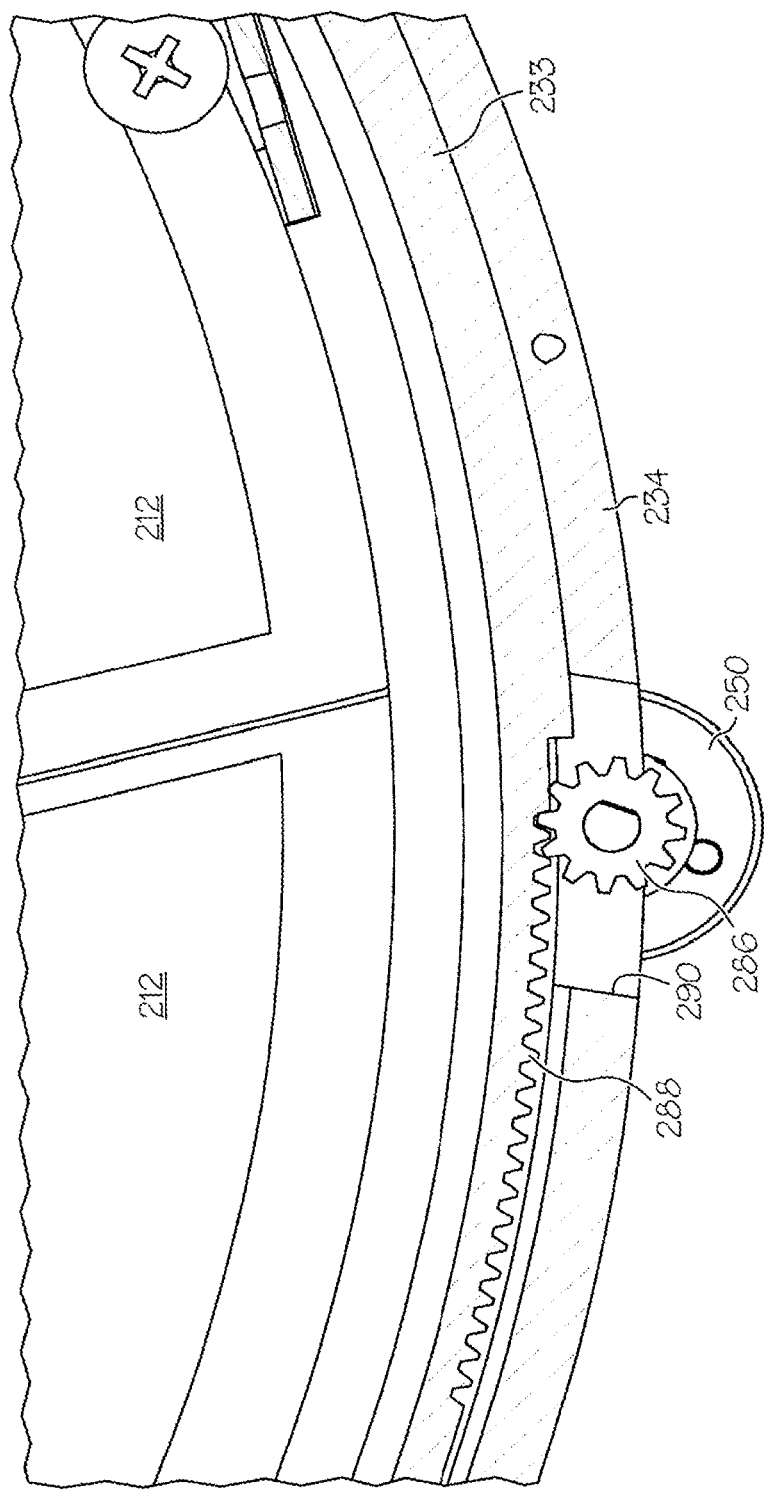

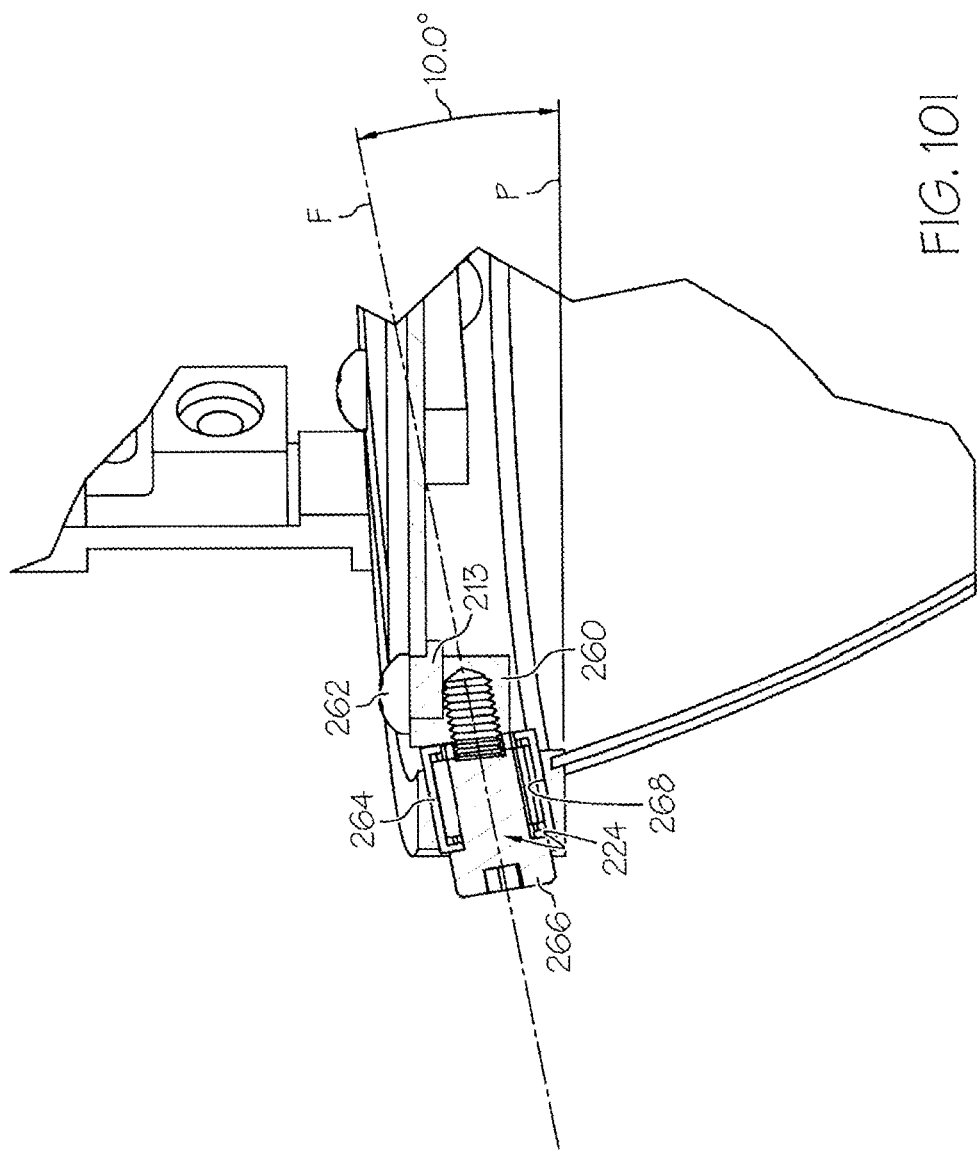

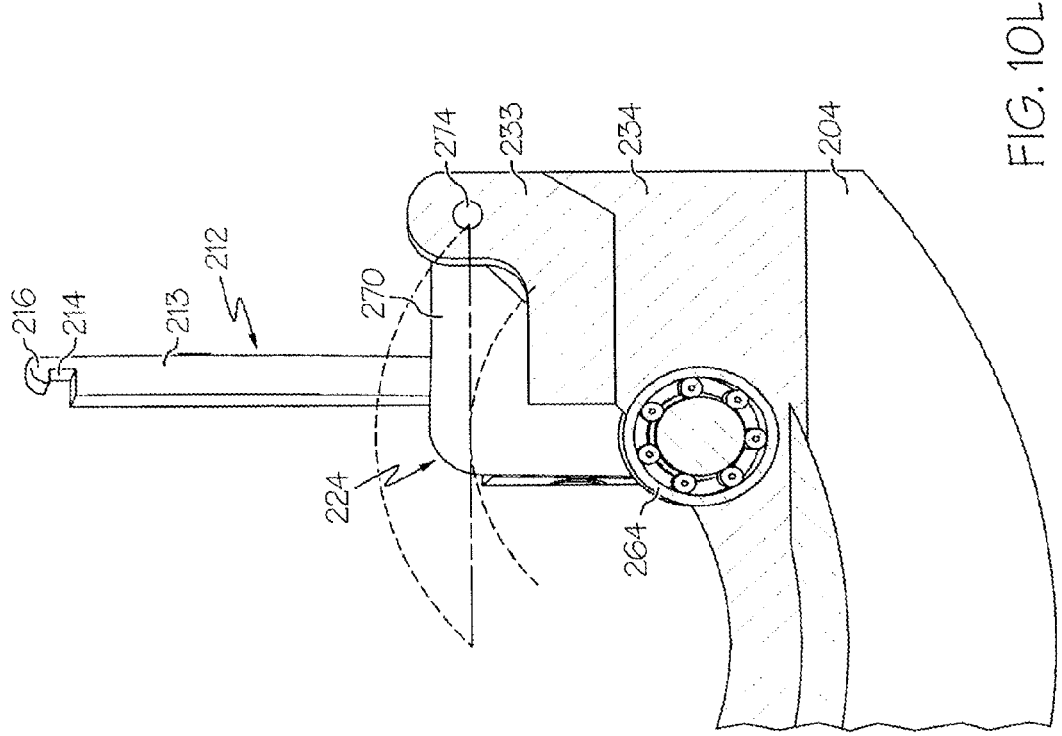

METHOD AND APPARATUS FOR SELECTIVE FILTERING OF AN ILLUMINATION DEVICE

TECHNICAL FIELD

The present disclosure relates to illumination devices, and more particularly, to a method and apparatus for selectively filtering an illumination device.

BACKGROUND

Vehicles, such as aircraft, may have lights mounted thereon for providing illumination during take-off, landing, or during search operations. Lights also may be useful for identifying aircraft or providing primary or supplemental lighting during operation of the aircraft in adverse conditions, including night operations, rain, and other particle storms. Alternatively, searchlights may be hand held or used in a smaller configuration, such as a flashlight, headlamp or night vision imaging device.

With the advent of night vision imaging systems for covert military operations, a need arose for landing lights, searchlights, and portable light sources that were compatible with night vision equipment by producing infrared light. While this need may be met by providing separate sets of infrared and visible spectrum lights, single light sources that may be converted between infrared and visible illumination have been developed.

One method of early lighting systems that were convertible between visible and infrared light utilized an infrared filter that was selectively placed over a visible light searchlight. Using such filters is cumbersome because of the difficulty in attaching and removing the filter. This limitation restricted the usefulness and applicability of lights equipped in this manner by limiting flights either to visible light or infrared light.

Lighting systems have been developed that include a lamp that has both visible and infrared filaments that allow an operator to switch between the two. Additional controls permit the lamp head to be extended, retracted, and rotated by electrical relays and a selector switch. An example of this design is described in U.S. Pat. No. 5,695,272 to Snyder et al.

Such designs provide significant advantages, including the ability to switch between infrared and visible light spectrums from within the cockpit, thereby eliminating the need to remove and replace an infrared filter manually to switch illumination modes. However, such lamps do not emit light at the same intensity as a dedicated infrared or visible light system because the bulb surface is divided between infrared and visible light filtering covers.

U.S. Pat. No. 6,962,423 to Hamilton et al. describes another multi-mode visible and infrared light head for use as a landing light or searchlight. That patent describes an illumination source having two separate diodes, one for emitting infrared and the other for emitting visible light, spaced apart in a searchlight, with each diode having its own reflector and filter cover. However, that arrangement also limits the amount of light that may be transmitted from the searchlight by dedicating a portion of the light-producing elements either to the infrared or to the visible spectrums.

Another dual mode searchlight is described in U.S. Pat. No. 7,518,133 to Giffen et al. That patent discloses an integrated searchlight light head having separate infrared and visible light illumination sources, each positioned within a reflector. The reflectors are merged and separated by an insulating material and air gap that provide cooling of the illumination sources. The merged reflector assembly provides improved light distribution over previous light sources. However, the merged reflectors are inferior to a single reflector and the combination of separate lighting elements reduces the intensity of the light that may be produced.

There is a need for an improved method and apparatus for filtering light emitted by an illumination device, such as a searchlight, capable of selectively switching the illumination device between infrared and visible light. There is also a need for an improved filtering apparatus that can be switched easily between infrared and visible illumination modes without modifying the searchlight housing or reflector. Further, there is a need for a multi-mode filter with improved light distribution and efficiency.

SUMMARY

In one embodiment, a filter is provided for use with an illumination device of a type having a reflector with an exit opening and an illumination source mounted within the reflector, the reflector shaped to direct radiation emitted from the illumination source through the exit opening. The filter may include an outer support shaped to be attached to a periphery of the exit opening; an inner support substantially concentric with the outer support; a composite filter having a plurality of filter elements extending between and pivotally attached to the inner and the outer supports, the filter elements being shaped and positioned to substantially cover the exit opening to filter the emitted radiation passing through the exit opening when pivoted to a closed position, and to allow the emitted radiation to pass substantially unfiltered through the exit opening when pivoted to an open position; and an actuator connected to pivot the filter elements to the closed position and to the open position.

In another embodiment, a filter is provided for use with an illumination device of a type having a reflector with an exit opening, an illumination source mounted within the reflector, the reflector being shaped to direct radiation emitted from the illumination source through the exit opening. The filter may include an outer support shaped to fit over a periphery of the exit opening; a composite filter having a plurality of filter elements; a plurality of pivots attaching the filter elements to the outer support such that the filter elements and extending radially inward, the filter elements being shaped and positioned to substantially cover the exit opening to filter the emitted radiation passing through the exit opening when pivoted to a closed position, and to allow the emitted radiation to pass substantially unfiltered through the exit opening when pivoted to an open position; and an actuator connected to pivot the filter elements to the closed position and to the open position.

In yet another embodiment, a method is provided for selectively filtering radiation from an illumination device of a type having a reflector with an exit opening and an illumination source mounted within the reflector, the reflector shaped to direct the radiation emitted from the illumination source through the exit opening. The method may include attaching an outer support to a periphery of the exit opening; providing an inner support concentric with the outer support; placing a filter over the opening, the filter including a composite filter having a plurality of filter elements extending between and pivotally attached to the inner and the outer supports, the filter elements being shaped and positioned to substantially cover the exit opening to filter the emitted radiation passing through the exit opening when pivoted to a closed position, wherein a first band or type of electromagnetic radiation from the illumination source is blocked, and to allow the emitted radiation to pass substantially unfiltered through the exit opening when pivoted to an open position; and selectively actuating the filter to pivot the filter elements to the closed position and to the open position.

The features, functions, and advantages of the disclosed method and apparatus will be apparent from the following description, the accompanying drawings and the appended claims.

BRIEF DESCRIPTION OF THE DRAWINGS

FIG. 4 is a perspective view of a typical filter element of the filter of FIG. 1;

FIG. 8 is a detail in perspective of the actuator assembly shown in FIG. 2;

FIG. 10A is a plan view of another embodiment of the disclosed filter, showing the filter in the closed position;

FIG. 10B is a section of a composite filter of the embodiment of FIG. 10A;

FIG. 10C is a detail of the pivot of the embodiment of FIG. 10A;

FIG. 10F is a detail of the embodiment of FIG. 10A showing the actuator motor;

FIG. 10I is a detail of the pivot assembly of the embodiment of FIG. 10A;

FIG. 10L is a detail, partially in section, of a pivot of the embodiment of FIG. 10A, pivoted to the open position.

DETAILED DESCRIPTION

Figure 1A:
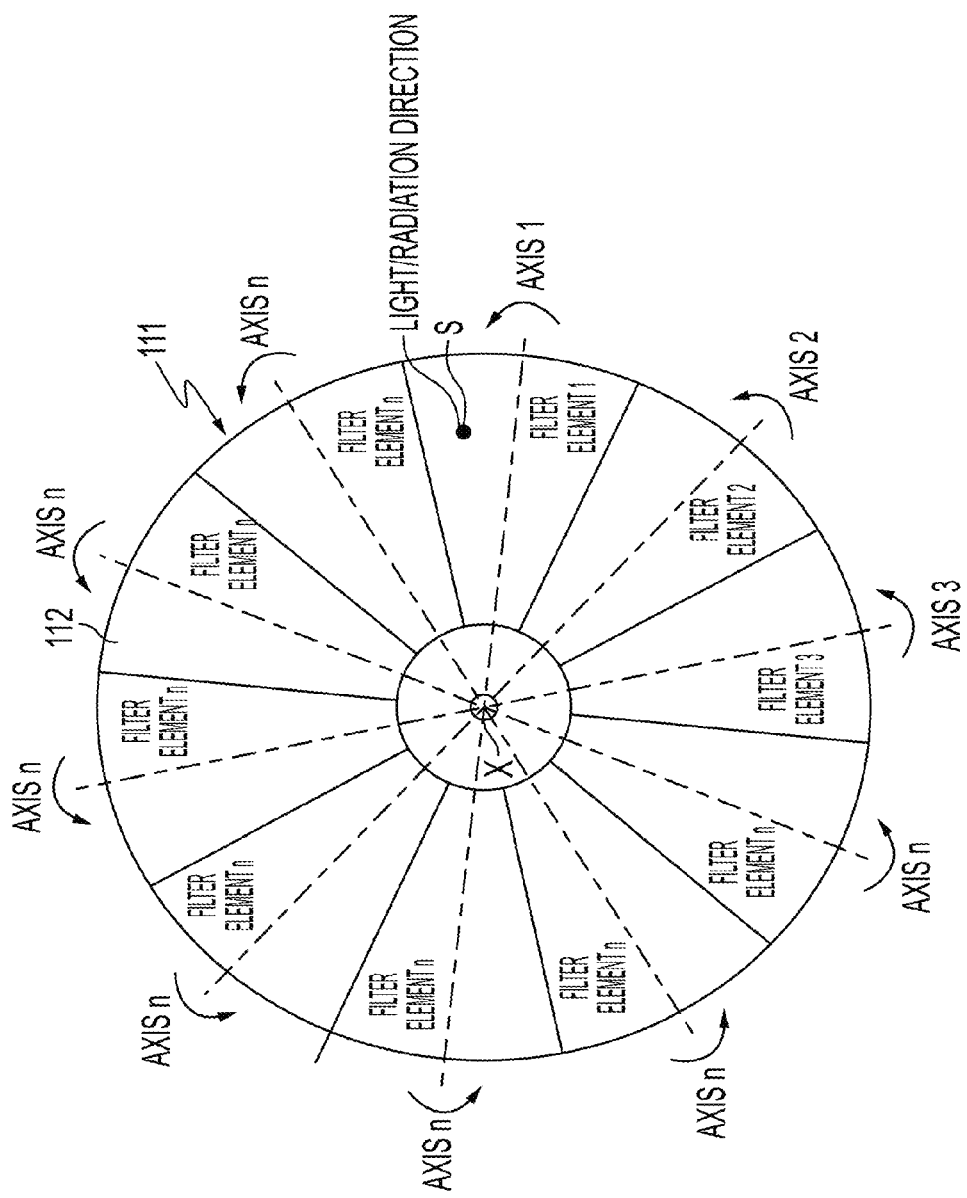
FIG. 1A is a schematic plan view of an embodiment of the disclosed filter showing the relationship between the radially extending axes and the filter elements in a closed position.
Figure 1B:
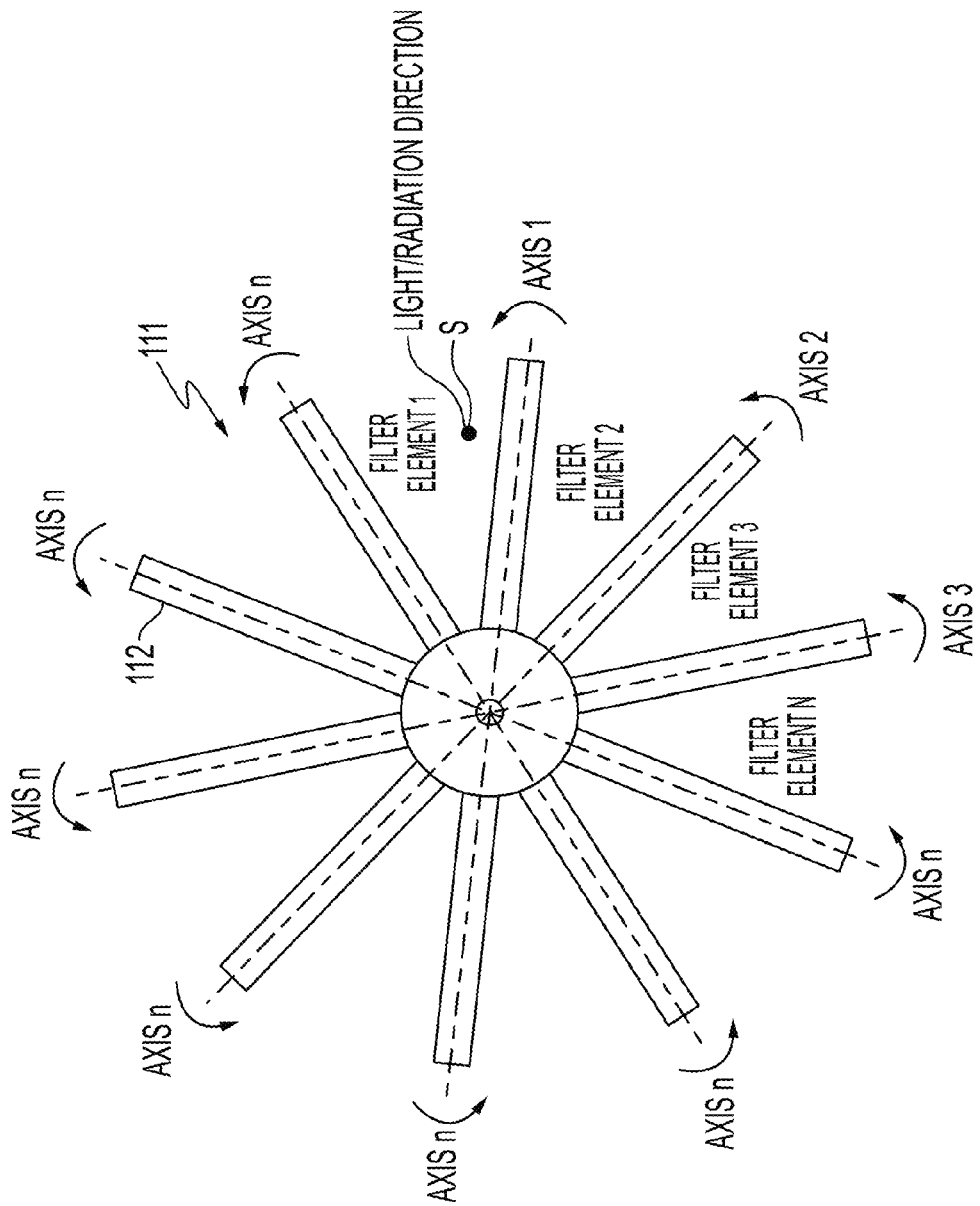
FIG. 1B is a schematic plan view of the filter of FIG. 1A showing the relationship between the radially extending axes and the filter elements in an open position.

As shown in FIGS. 1A and 1B, the disclosed filter, generally designated 100, may include a composite filter 111 that may be made up of filter elements 112. Each filter element 112 may be associated with an axis n extending from a common origin x. Each filter element 112 may be configured to rotate about its associated axis n from a first closed position (FIG. 1A) to a second, open position (FIG. 1B). In an embodiment, the axes n are substantially coplanar and may be evenly distributed 360 degrees about the common origin x. When closed, the filter elements 112 form a substantially planar composite filter 111 in the shape of a ring. When the filter elements 112 are in a closed position (FIG. 1A), the ring is substantially orthogonal to an emittance of radiation generated from light source s. When the filter elements 112 are in an open position (FIG. 1B), the filter elements rotate from the composite filter plane and are substantially parallel to an emittance of radiation generated from light source s.

Figure 2:
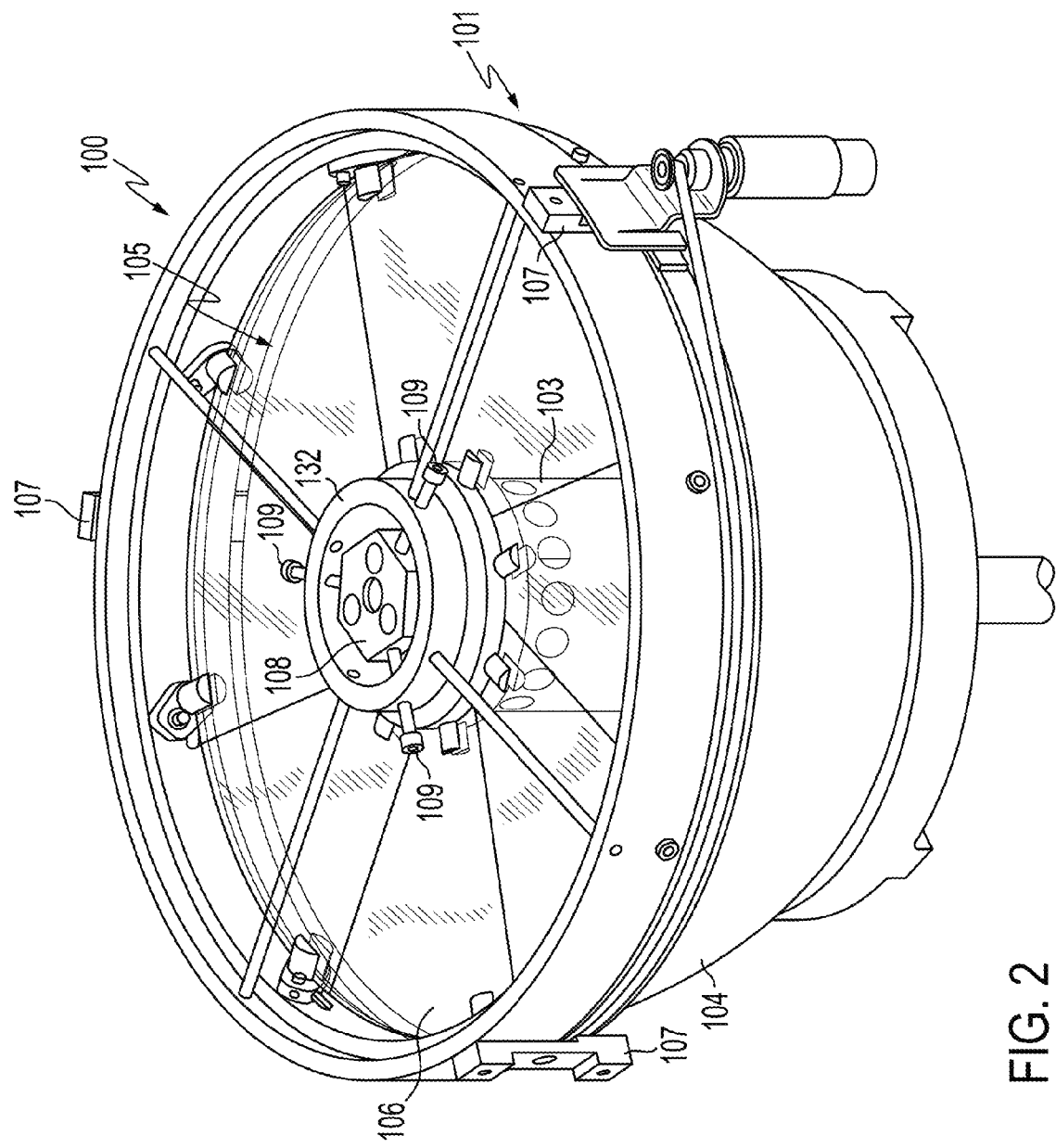
FIG. 2 is a perspective view of an embodiment of the disclosed filter, shown mounted on a searchlight.
Figure 3A:
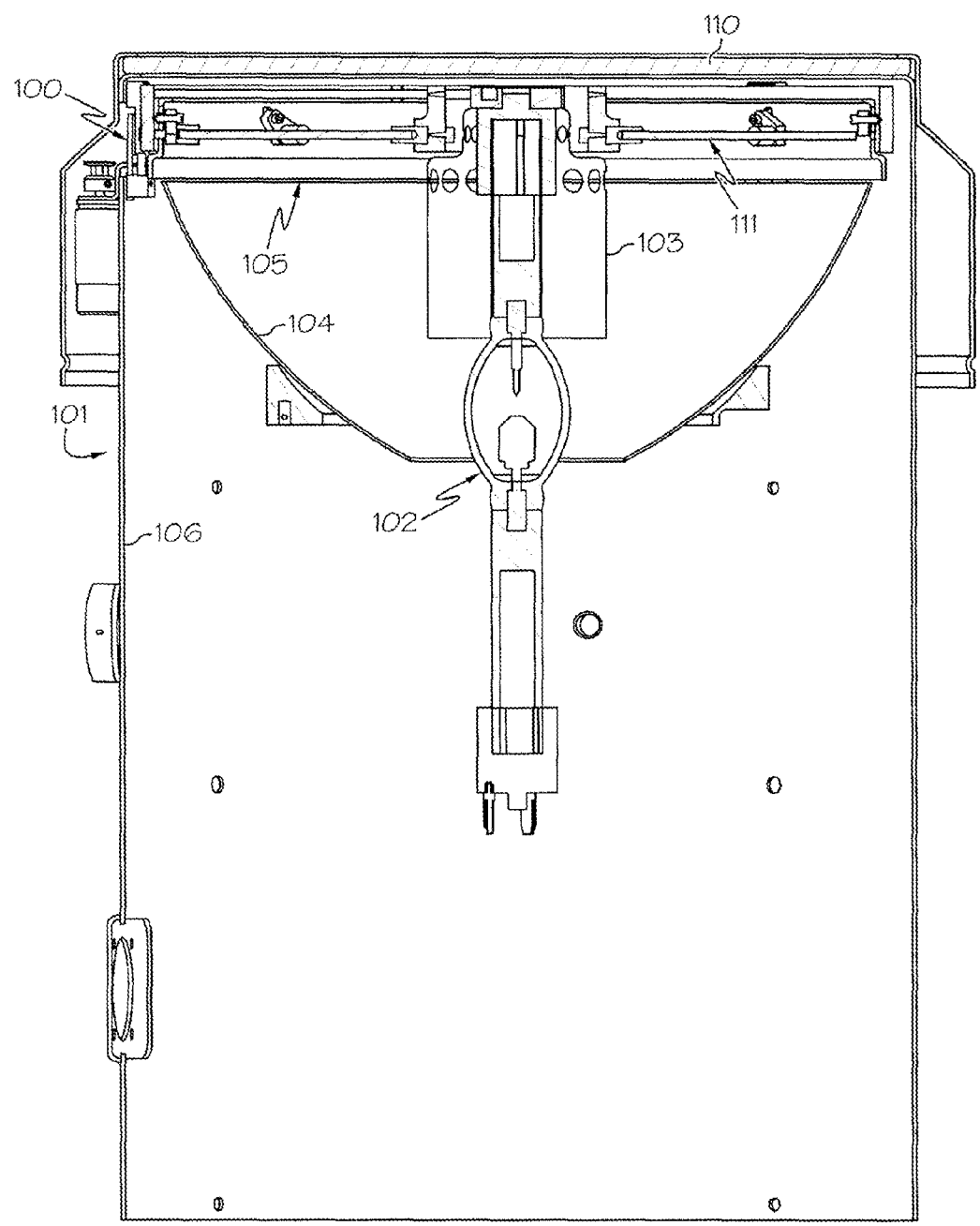
FIG. 3A is a side elevation in section of the filter and searchlight of FIG. 1, mounted within a searchlight housing.

As shown in FIGS. 2 and 3A, in one aspect the disclosed filter 100 is adapted to be mounted on an illumination device, such as a searchlight, generally designated 101. The searchlight 101 may include an illumination source 102, a cylindrical baffle 103, and a reflector 104 for directing radiation emitted from the illumination source 102 through a periphery defining an exit opening 105. The searchlight may include a housing 106 that encloses the illumination source 102, baffle 103 and reflector 104. The housing 106 also may support the filter 100 above the reflector 104 (as oriented in FIGS. 1 and 2) by mounting brackets 107 extending between the filter and housing.

The illumination source 102 may include a cathode 108 that is positioned substantially in the center of the exit opening 105. The filter 100 may be centered relative to the electrode 108 by set screws 109. The housing 106 also may include a protective window 110 that covers the exit opening 105 and encloses the filter 100 (see FIG. 3A).

While the filter 100 is shown and described as used in combination with a searchlight 101, it is to be understood that the filter may be used with other types of illumination devices, such as aircraft landing lights and other vehicle-mounted lights, without departing from the scope of the invention. Also, while the filter is described as filtering a light source 102 that emits a spectrum of electromagnetic radiation that includes visible light, it is within the scope of the invention to utilize an illumination source that may emit other types of electromagnetic radiation.

The reflector 104 may be parabolic in shape to convert radiation emitted from the light source 102 into a collimated beam extending perpendicular to the plane of the opening 105. The position of the light source 102 also may be adjustable within the reflector 104 to convert the light from a collimated beam either to a converging beam or a diverging beam.

Figure 3B:
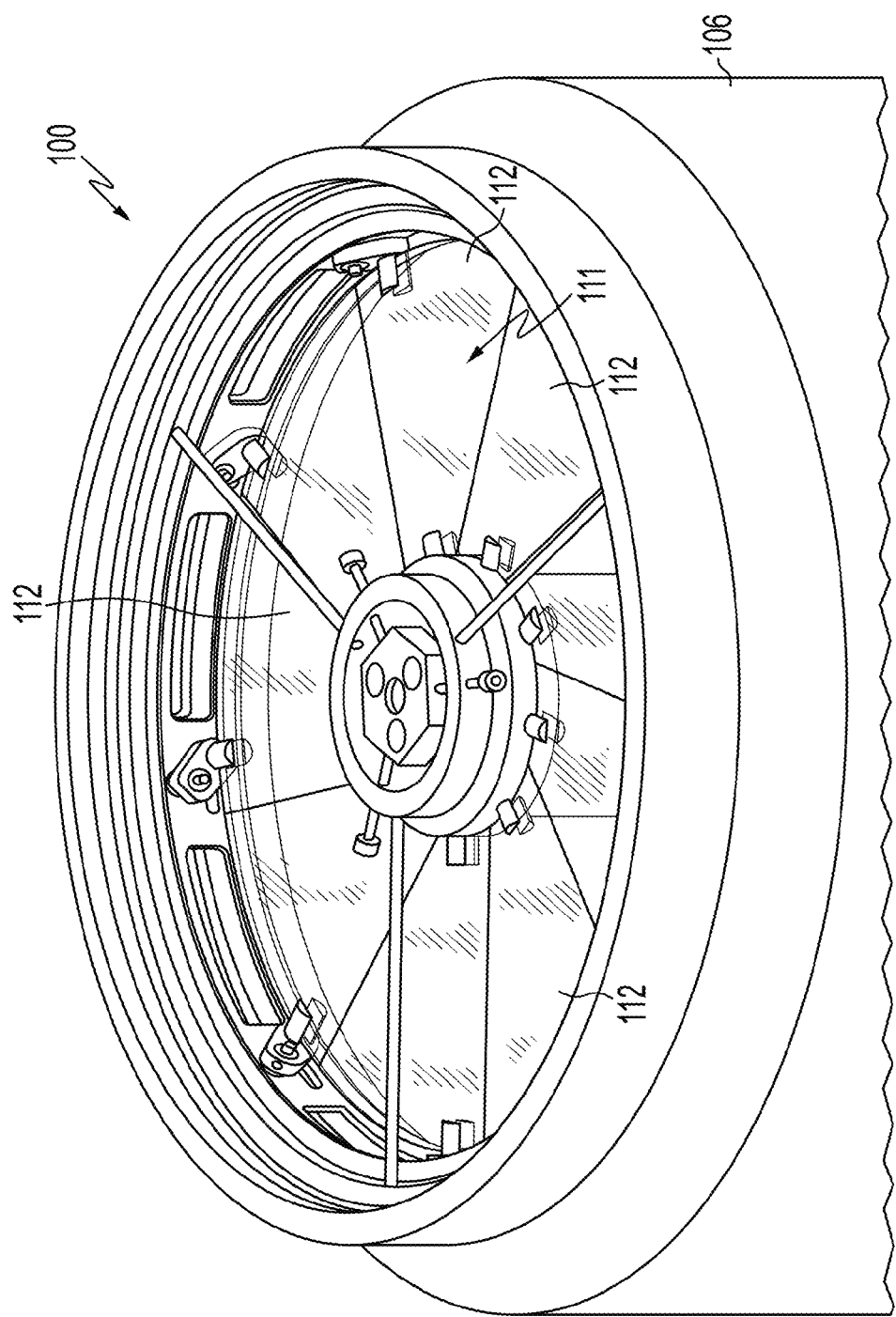
FIG. 3B is a detail in perspective of the filter and searchlight of FIG. 1, in which the filter is in a closed position.
Figure 3C:
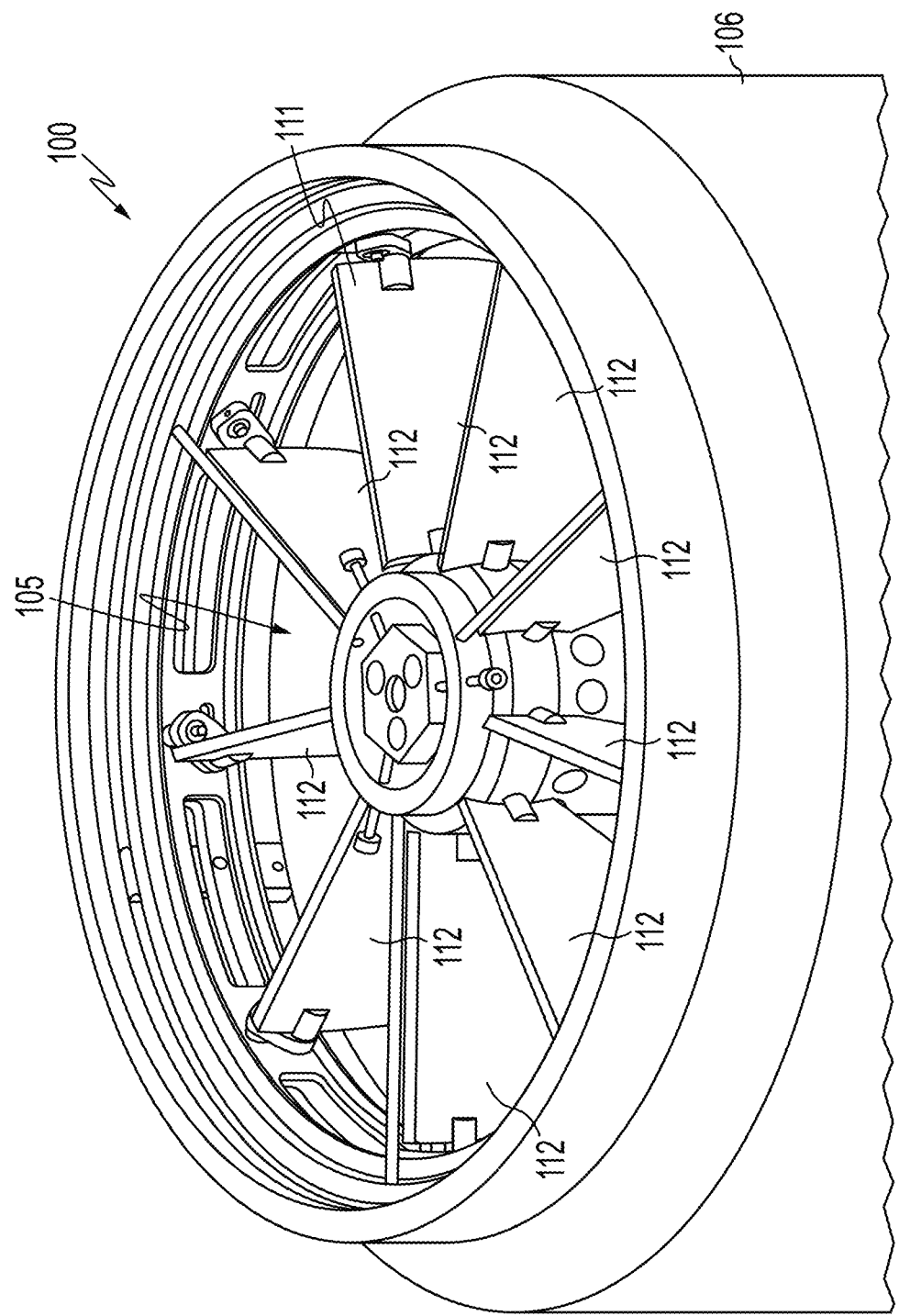
FIG. 3C is a detail in perspective of the filter and searchlight of FIG. 1, in which the filter is in an open position.

As shown in FIGS. 3A-C, the filter 100 may be selectively engaged to be mounted over the exit opening 105 to filter emitted radiation reflected through the exit 105 by the reflector 104. The filter 100 may include a composite filter 111 in which the filter elements 112 are pivotally mounted and are shaped and positioned to overlap and substantially cover the opening 105 to filter substantially all radiation passing through the opening. FIG. 3B shows the filter 100 where filter elements 112 are pivoted to a closed position, in which substantially all radiation leaving the searchlight 101 is filtered. FIG. 3C shows the filter 100 in which the filter elements 112 are pivoted to an open position in which emitted radiation is substantially unfiltered.

As shown in FIG. 4, each filter element 112 may be substantially wedge shaped and may include a substantially flat piece of filter material shaped to have a relatively narrow, arcuate, radially inner end 114 and increase in width radially outward to terminate in a relatively wide, arcuate outer end 116. The width of each filter element 112 diverges radially outwardly at an angle α that preferably is inversely proportional to the number of filter elements 112 required to extend about the entire periphery of the opening 105 of the searchlight 101. For example, the angle α may be expressed as 360/N where N equals the required number of filter elements 112. The filter elements 112 may be wider than the minimum required to cover the opening 105 to provide a slight overlap between adjacent filter elements 112 when the filter elements are in a closed position, or may include, for example, tapered edges that overlap one another when the filter elements are in a closed position.

In one aspect, the composition of the filter elements 112 may selected to substantially block (by, for example, absorption or reflection) a first band or type of electromagnetic radiation, such as visible light, emitted by the illumination source 102 (see FIG. 2A), while allowing a second band or type of electromagnetic radiation, such as infrared radiation, to pass through. It is within the scope of the invention to fabricate the filter elements 112 of material that blocks and allows to pass other bands or types of electromagnetic radiation, and to provide filter elements made of materials different from each other, so that the composite filter 111 may be comprised of filter elements 112 made of different materials blocking and allowing to pass different bands or types of electromagnetic radiation.

In one aspect, the filter elements 112 may be dichroic or thin-film filters. Such filters have the advantage of reflecting unwanted wavelengths rather than absorbing them, as would be the case with a dyed glass or plastic filter. The substrate selection is dependent on the transmission requirements. In the case of an IR (infrared) filter for night-vision illumination, the primary interest is providing illumination in the NIR spectrum for which PYREX (a trademark of Corning Incorporated, Corning, N.Y.) is more than sufficient. Examples of such materials include NightVision Filter by Optics Balzers, Longwave Pass (LWP) Infrared Coatings by Reynard Corporation and Long Pass Trim Filter by ZC&R Coatings for Optics, Inc.

Figure 5:
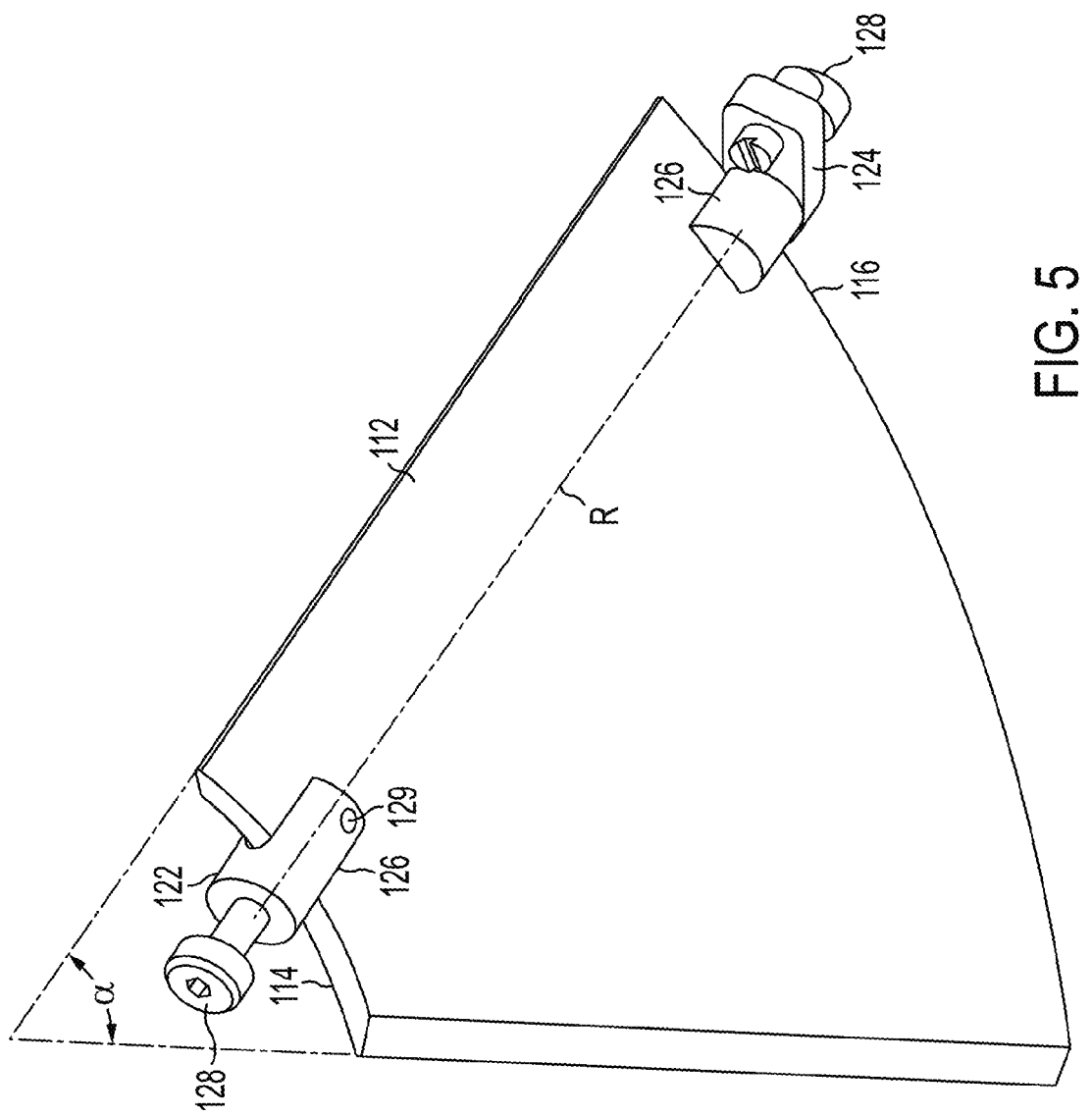
FIG. 5 is a perspective view of the filter element of FIG. 4 attached to a pivot assembly.

As shown in FIG. 5, the filter 100 may include a pivot assembly for pivotally supporting the filter elements 112. The pivot assembly may include an inner support 122 attached to each filter element 112 at inner end 114, and an outer support 124 attached to the outer end 116. The supports 122, 124 each may include a clamp 126, attached to the filter element 112, and a pivot pin 128. Each clamp 126 may be secured to its respective filter element 112 by an adhesive, pin, rivet or set screw 129. The pivot pins 128 of the inner and outer supports 122, 124 respectively may define an axis R about which the clamp 126 (and therefore the associated filter element 112) may pivot, and therefore the supports 122, 124 may be positioned opposite one another on the filter element 112 so that the pins 128 are colinear.

The pivot axis R may extend generally radially from the first end 114 to the second end 116 of the filter element 112. In one aspect, this pivot axis R may be offset from one of the edges of the filter element 112, or alternatively may be at any position along the filter element 112 at an angular offset from the edge. In alternative arrangements, the pivot axis R may be outside the boundaries of the filter element 112.

Figure 6A:
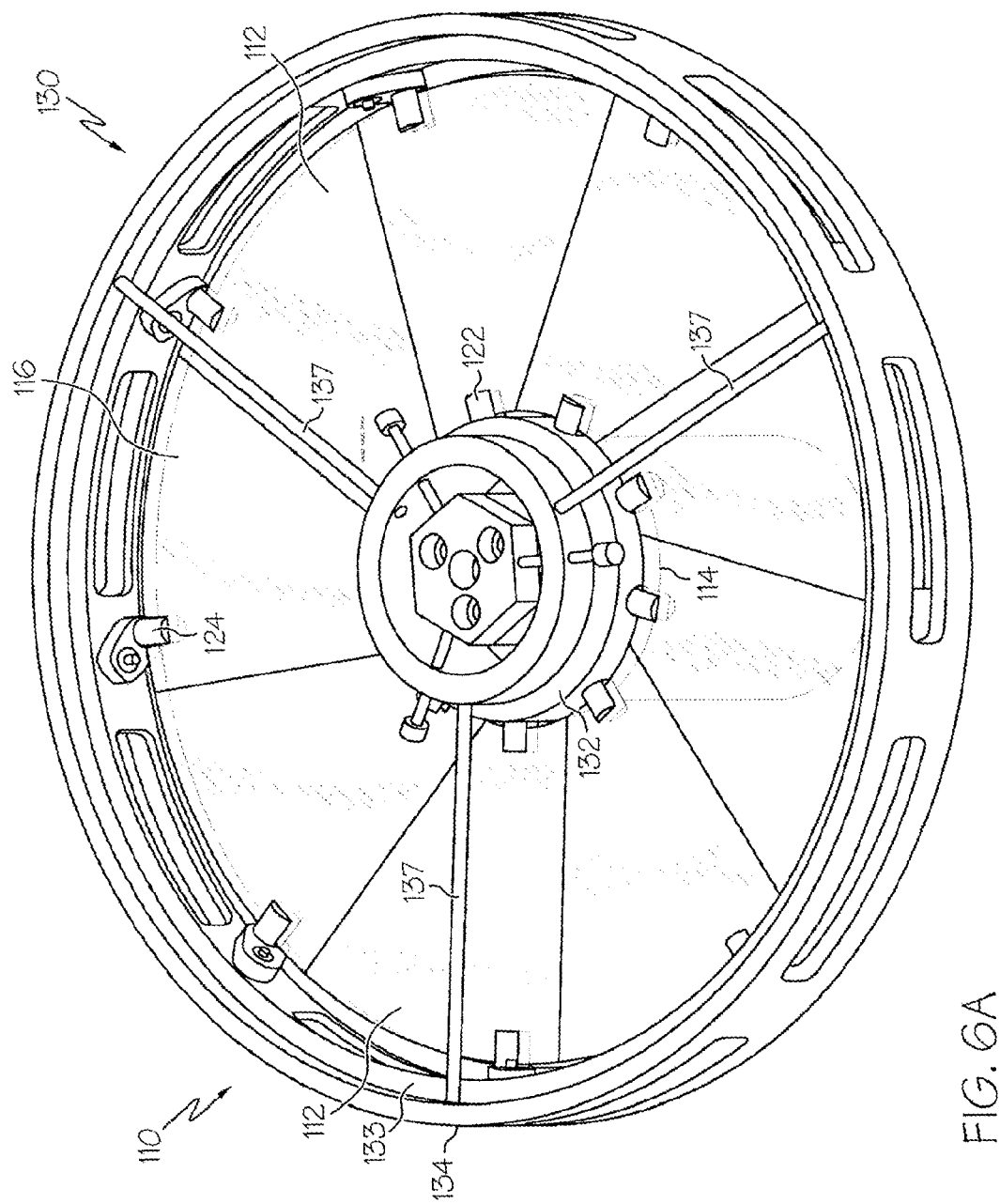
FIG. 6A is a perspective view of the filter of FIG. 2.
Figure 6B:
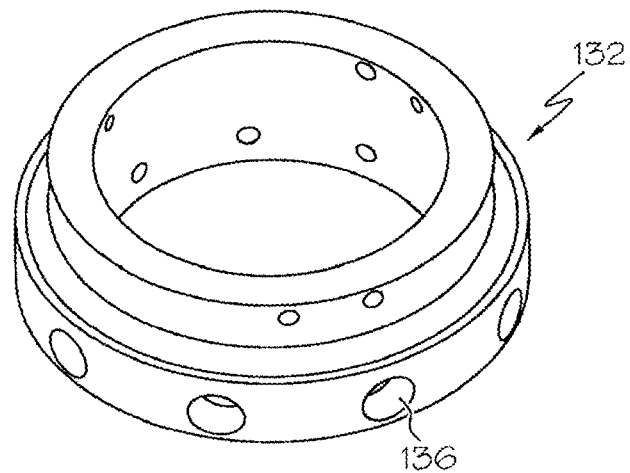
FIG. 6B is a perspective view of a central lamp shield of the filter of FIG. 6A.

As shown in FIG. 6A, the filter elements 112 may be mounted on support structure, generally designated 130. The support structure 130 may include an inner support in the form of a central lamp shield 132 (see also FIGS. 2 and 6B), an inner peripheral support ring 133 and an outer peripheral support ring 134. As shown in FIG. 6B, the central lamp shield 132 may include a plurality of openings 136 (FIG. 6B) for receiving the pivot pins 128 (FIG. 5) of the inside supports 122 to support the inner ends 114 of the filter elements 112, while allowing the inside support 122 to pivot about the pin 128.

The outer peripheral support ring 134 is fixed relative to the central lamp shield 132 and is connected thereto by a spider in the form of radially extending struts 137. The outer peripheral support ring 134 includes openings 138 shaped and positioned to receive the pivot pins 128 (see FIG. 5) of the outer supports 124 of the filter elements 112.

Figure 6C:
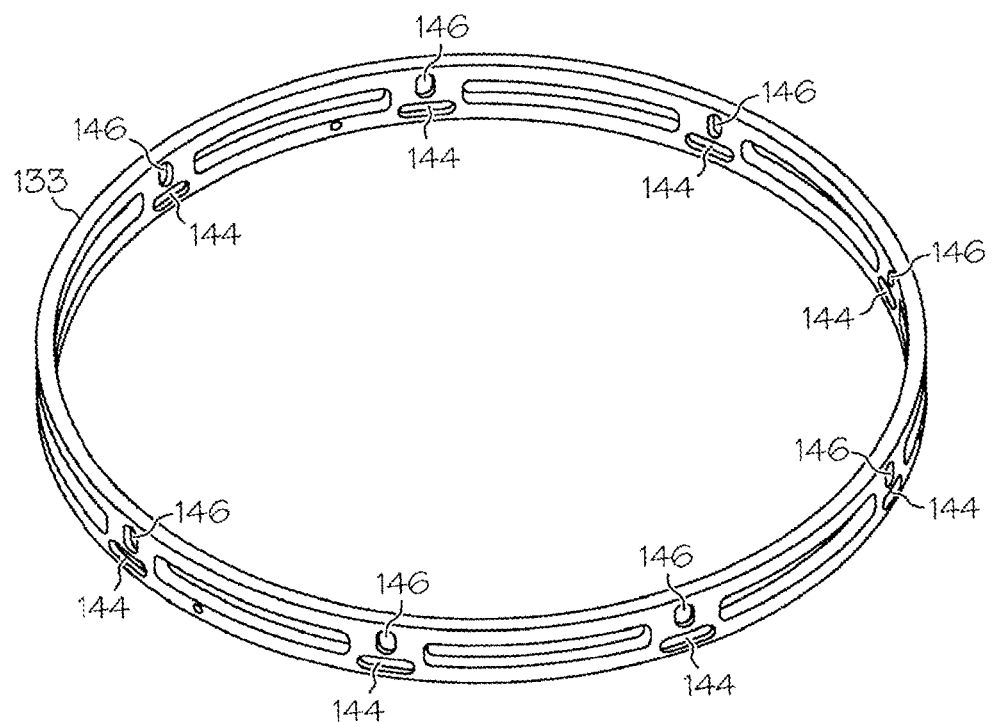
FIG. 6C is a perspective view of an inner peripheral rim of the filter of FIG. 6A.
Figure 7A:
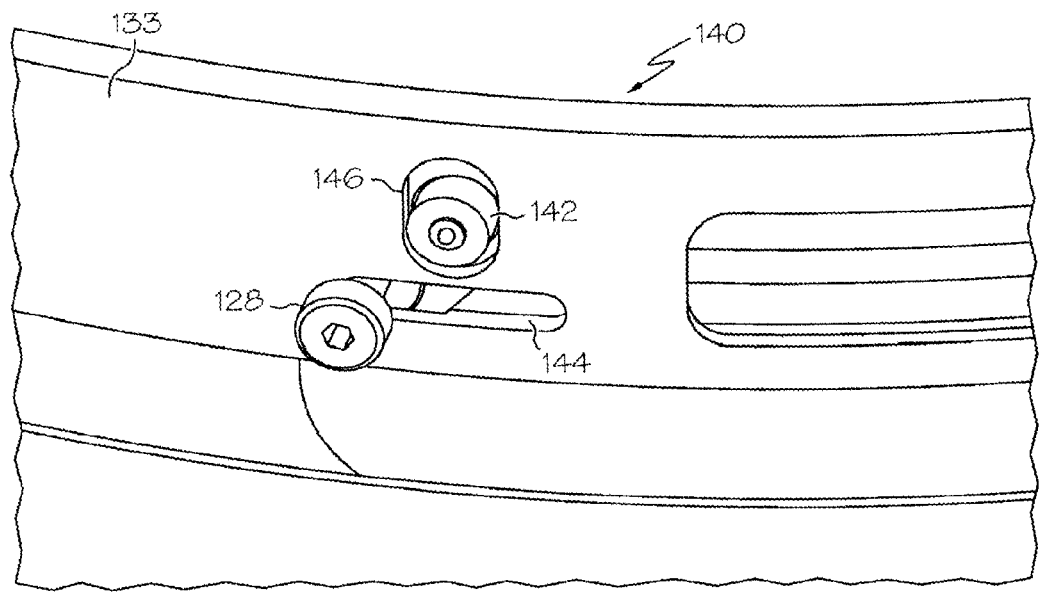
FIG. 7A is detail in perspective of a typical filter element outer pivot attachment, viewed from outside an associated searchlight.
Figure 7B:
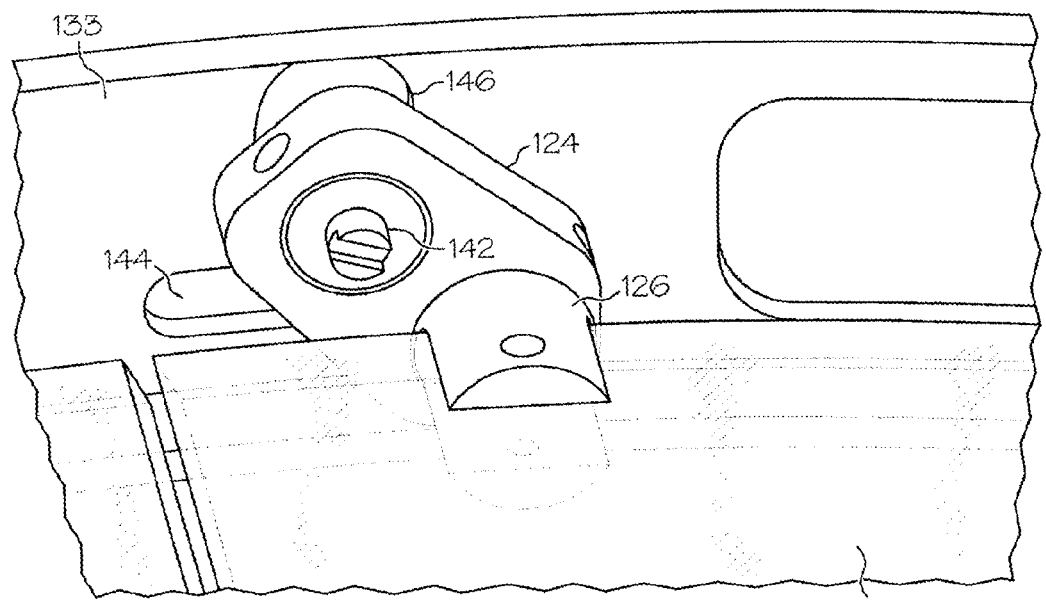
FIG. 7B is a detail in perspective of the pivot attachment of FIG. 7A, viewed from inside an associated searchlight.

As shown in FIG. 6C, the inner support ring 133 may include pairs of horizontal and vertical slots 144, 146, respectively, corresponding in number to the number of filter elements 112 of the filter 100. The horizontal slots 144 receive the pivot pins 128 of the outer supports 124 and, as shown in FIGS. 7A and 7B, the vertical slots 146 receive locking pins 142. The slots 144, 146 may act as cam surfaces against which the pins 128, 142 may slide.

Figure 6D:
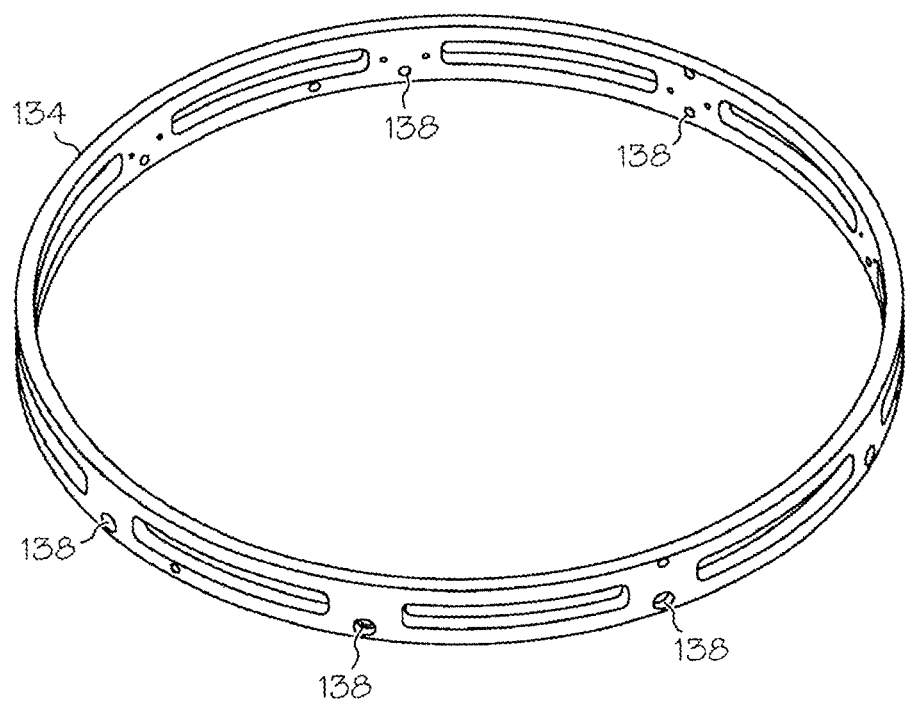
FIG. 6D is a perspective view of the outer peripheral rim of the filter of FIG. 6A.

The pivot pins 128 of the outer support 124 also may be supported by openings 138 (shown in FIG. 6D) in the outer peripheral support ring 134. These openings 138 may allow the pivot pins 128 to rotate, but hold the position of the pivot pins fixed relative to the outer peripheral support ring 134, and hence the filter 100. The terms "horizontal" and "vertical" are used here for ease of identification. It is to be understood that the searchlight 101 may be positioned in a number of orientations where the angle of these slots relative to the horizon may change. Further, the slots 144, 146 may not be perfectly linear and may include a radius.

As shown in FIG. 6A, the inner peripheral support ring 133 may be surrounded and concentric with the outer support ring 134, and may be rotatable relative to the outer support ring. As the inner peripheral support ring 133 is rotated relative to the outer peripheral support ring 134, the openings 138 (FIG. 6D), which receive the pivot pins 128, hold the pivot pins fixed relative to the filter 100, thus causing the horizontal cam slots 144 of the inner support ring to move along the pivot pins 128 (shown in FIG. 7A) as the inner support ring rotates. Because the locking pins 142 are constrained within their respective vertical cam slots 146, rotation of the inner peripheral support ring 133 will rotate the filter elements 112 in unison about their respective pivot pins 128 rather than translate along the slots 144. As the horizontal slots 144 of the inner peripheral support ring 133 move relative to the pivot pins 128, the distance between the pivot pins 128 and locking pins 142 will remain constant. The locking pins 142 will thus travel along the vertical slots 146 as each filter element 112 is rotated about its axis R.

According to one aspect, the filter 100 may include a locking element to secure the filter elements 112 in either an open (non-filtering) or closed (filtering) configuration so that the filter elements remain in that position until again activated to shift to the other position. For example, a spring-actuated detent (not shown) may be included that resists rotation of the filter elements 112.

As shown in FIGS. 2, 8, 9A and 9B, the filter 100 may include an actuator, generally designated 150, to rotate the inner support ring 113. The actuator 150 may include a motor 152 with a drive pulley that engages a friction belt 154 that extends about the periphery of the outer support ring 134. The motor 152 may be a stepper motor and/or may include limit switches (not shown) to limit the rotation of the outer support ring 134 between a closed position, shown in FIG. 9A, in which the filter elements 112 are each pivoted to close the opening in the searchlight, and an open position, shown in FIG. 9B.

Figure 9A:
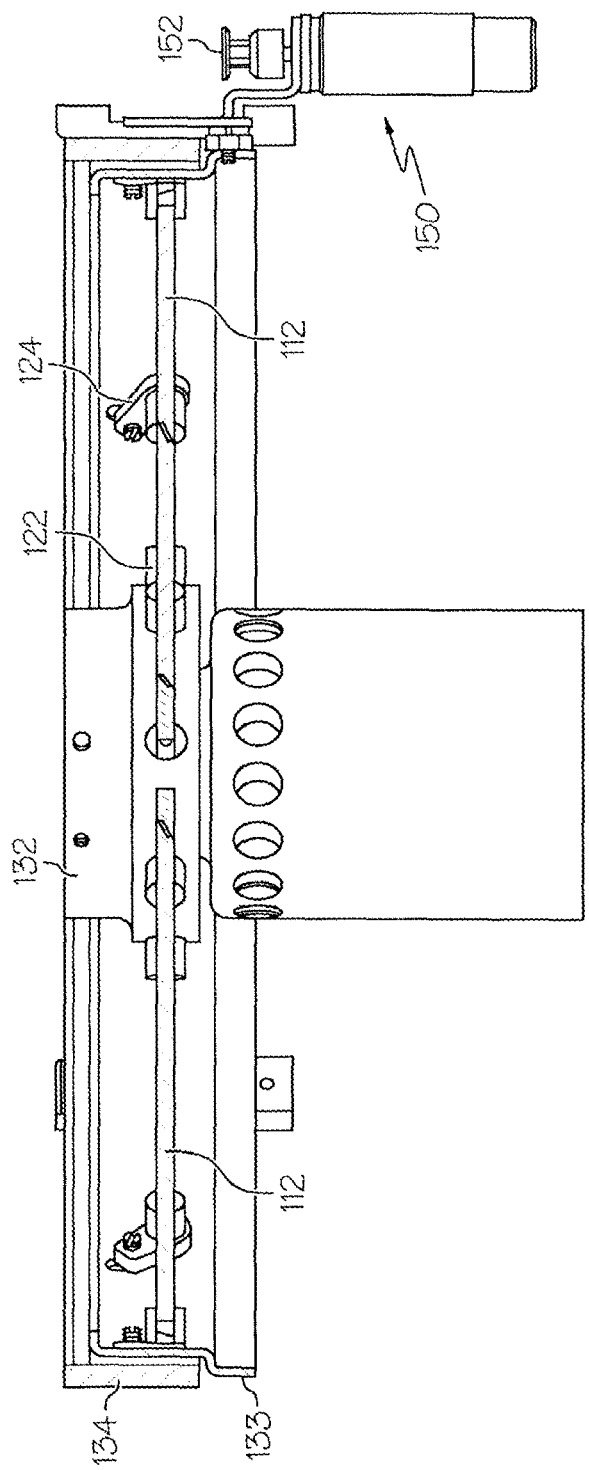
FIG. 9A is a side elevation in section of the filter of FIG. 2, shown in a closed position.
Figure 9B:
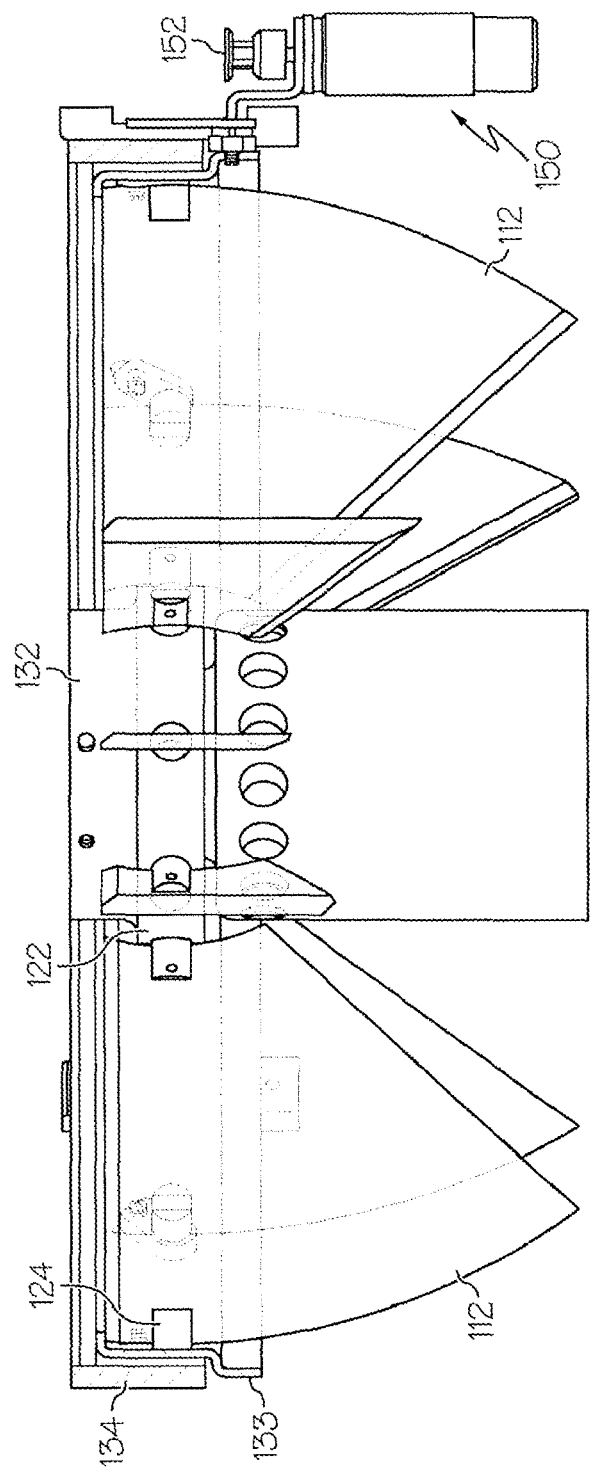
FIG. 9B is a side elevation in section of the filter of FIG. 2, shown in an open position.

As shown in FIG. 9A, when pivoted to the closed position, the filter elements 112 lie substantially in a composite filter plane that is perpendicular or orthogonal to a beam of electromagnetic radiation reflected through the filter 100 by reflector 104. As shown in FIG. 9B, when pivoted to the open position, the filter elements 112 are each pivoted to lie in planes that are substantially parallel to the beam of electromagnetic radiation reflected through the filter 100 by reflector 104, which planes are perpendicular to the searchlight opening 105 (see also FIG. 3C).

Figure 10D:
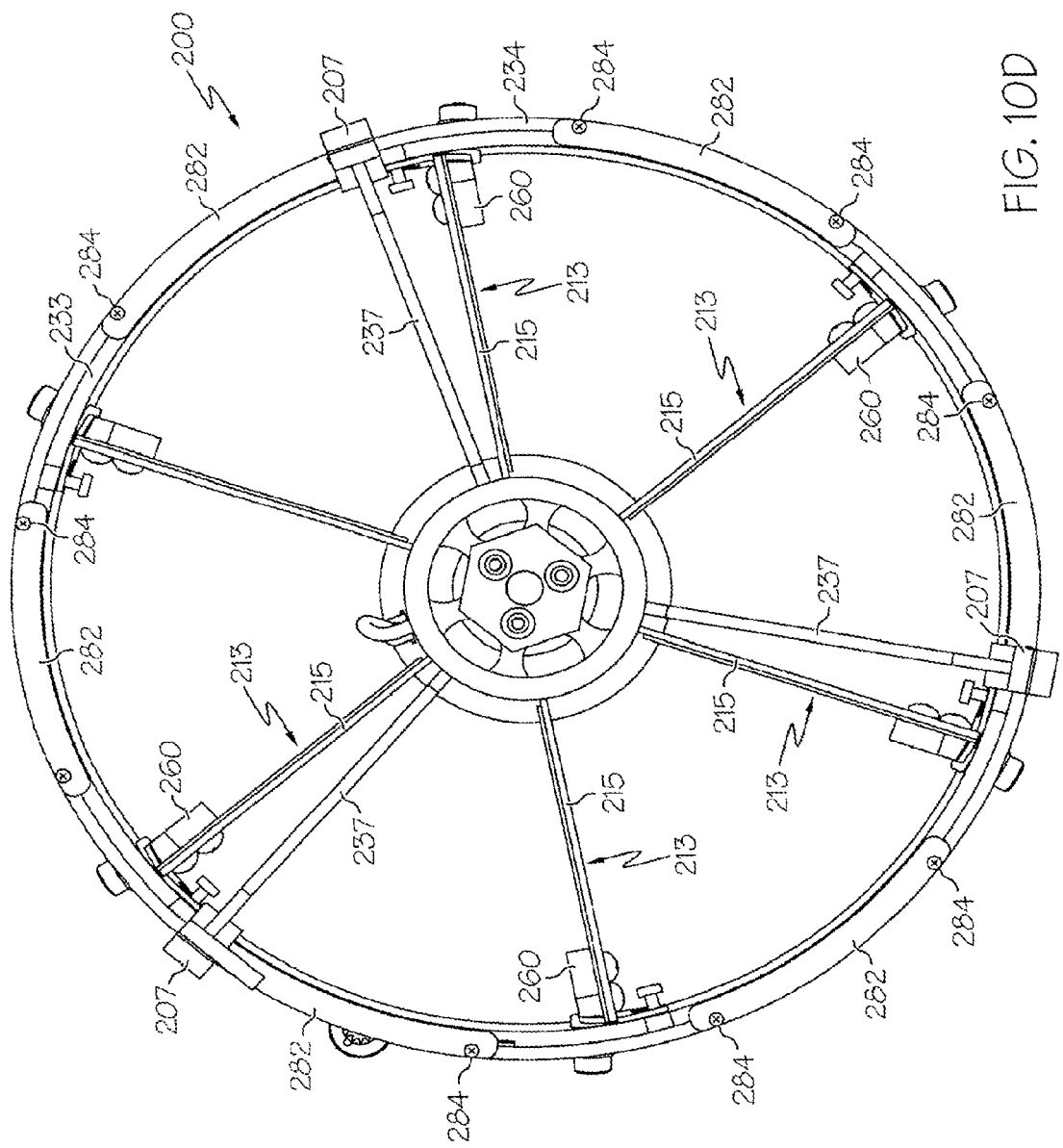
FIG. 10D is a plan view of the embodiment of FIG. 10A in which the filter elements have been pivoted to an open position.
Figure 10E:
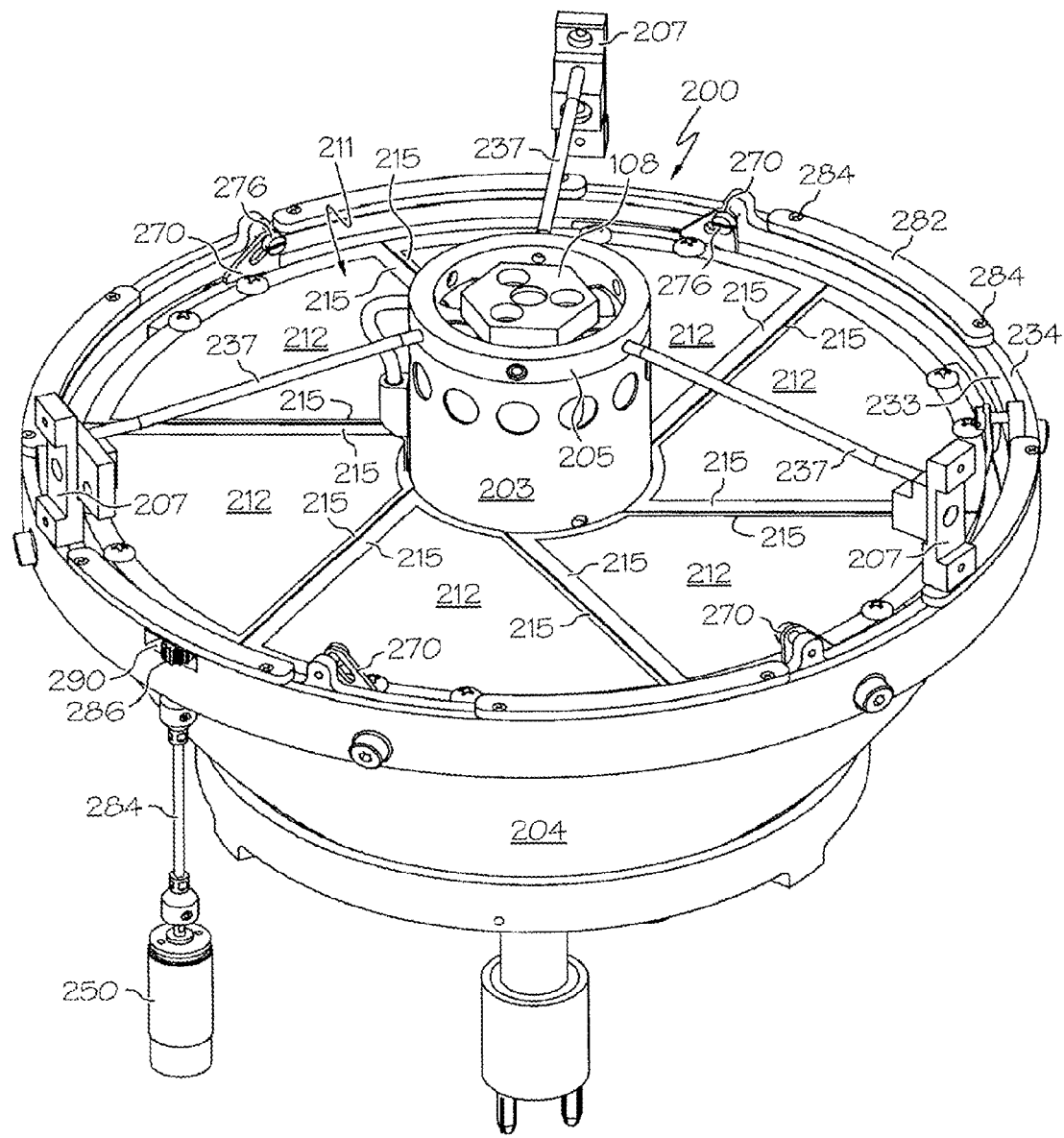
FIG. 10E is a perspective view of the embodiment of FIG. 10A, shown mounted on a searchlight.

FIGS. 10A-L show another embodiment of the filter, generally designated 200, having a composite filter 211 made up of filter elements 212, each including a frame 213 extending about its periphery. As shown in FIGS. 10A and 10E, the filter elements 212 and frames 213 may be shaped to overlap when in the closed position. Unlike the filter elements 112 shown in FIG. 2A, for example, the filter elements 212 may be asymmetric in shape and include side walls 215 that extend at oblique angles to the center of the filter 200 and baffle 203.

With this embodiment, as best shown in FIGS. 10A, 10D and 10E, the baffle 203 extends above the composite filter plane of the filter 200 and may include a ring 205 that receives the inner ends of support struts 237. The outer ends of struts 237 may be attached to mounting brackets 207 that in turn may be attached to the housing 106 (see FIG. 2A). The struts 237 keep the baffle 203, and the cathode 108, which is attached to and centered within the ring 205, centered relative to the reflector 204. The outer peripheral support ring 234 may be attached to the reflector housing 204, and non-rotatably attached to the reflector housing 106 (FIG. 3A).

The frames 213 are mounted on inner and outer peripheral support rings 233, 234, respectively and are unsupported at their radially inner ends adjacent the baffle 203. The radially inner ends of the frames 213 may be shaped to conform to the contour of the adjacent wall of the baffle 203. Thus, the frames 213 are cantilevered inwardly from inner and outer peripheral support rings 233, 234, respectively. The side walls of the frames 213 may include slots 214 (see FIGS. 10G and 10L) that are spaced slightly inward from the frame edges, forming ribs 216. When pivoted to the closed position, as shown in FIGS. 10A and 10E, the filter elements 212 are shaped and positioned such that the ribs 216 of a filter frame 213 may be received within the slots 214 of the adjacent filter elements. This interlock prevents emitted light from "leaking" through the composite filter 211 when in the closed position.

Figure 10G:
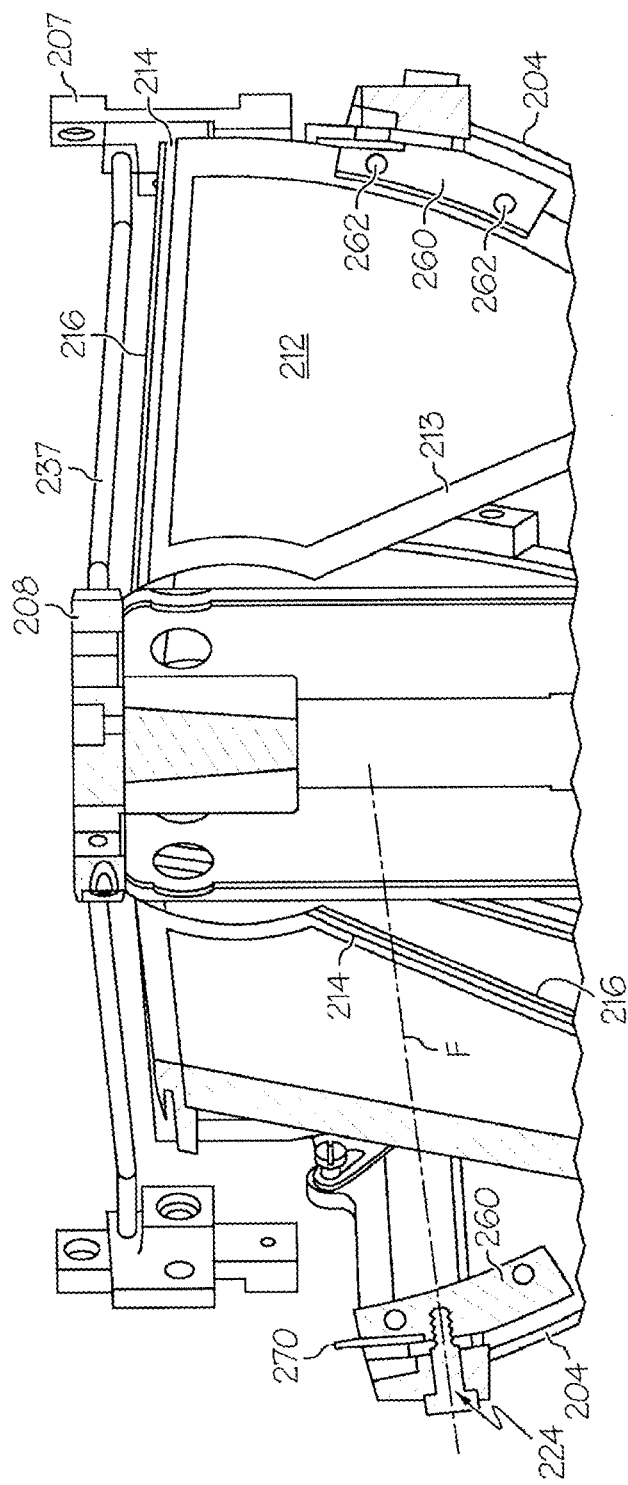
FIG. 10G is a detail elevational view of the embodiment of 10A, partially in section, and in which the composite filter is in the open position.
Figure 10H:
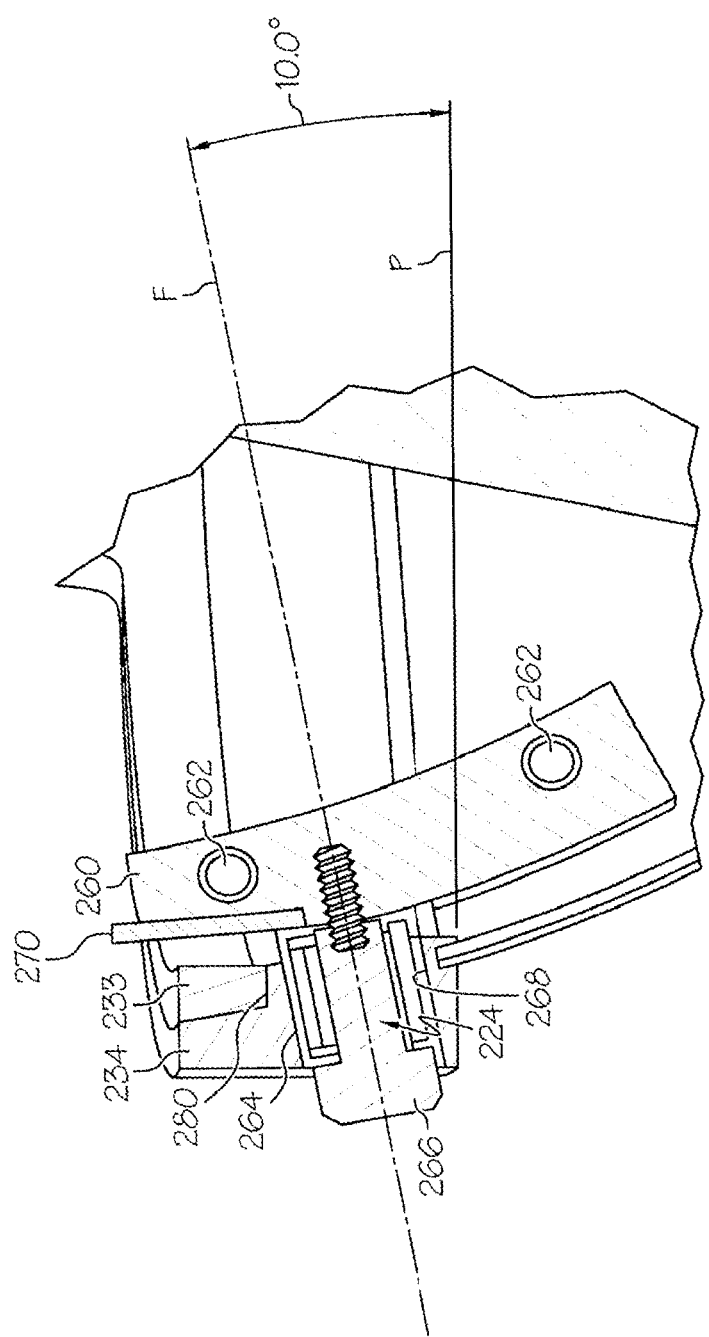
FIG. 10H is a detail of the pivot assembly of the embodiment of FIG. 10A.

The frames 213 may be attached to the peripheral support rings 233, 234 by pivots, generally designated 224, best shown in FIGS. 10B, 10C, 10G, 10H and 10I. Each pivot 224 may include a flange 260 attached to an associated frame 213 by means such as screws 262. The flange 260 may be attached to a bearing 264 by a mounting screw 266. The bearing 266 may be pressed into a hole 268 formed in the outer peripheral support ring 234, as best shown in FIGS. 10C, 10H and 10I. The hole 268 in the outer ring 234 may be inclined at an angle relative to the composite filter plane P, and in an embodiment angled upwardly from the composite filter plane P in the closed position (see FIGS. 10A and 10E) so that each filter element 212 will pivot about an axis F (see FIGS. 10H and 10I) that is inclined to the plane P of the composite filter 211.

Figure 10J:
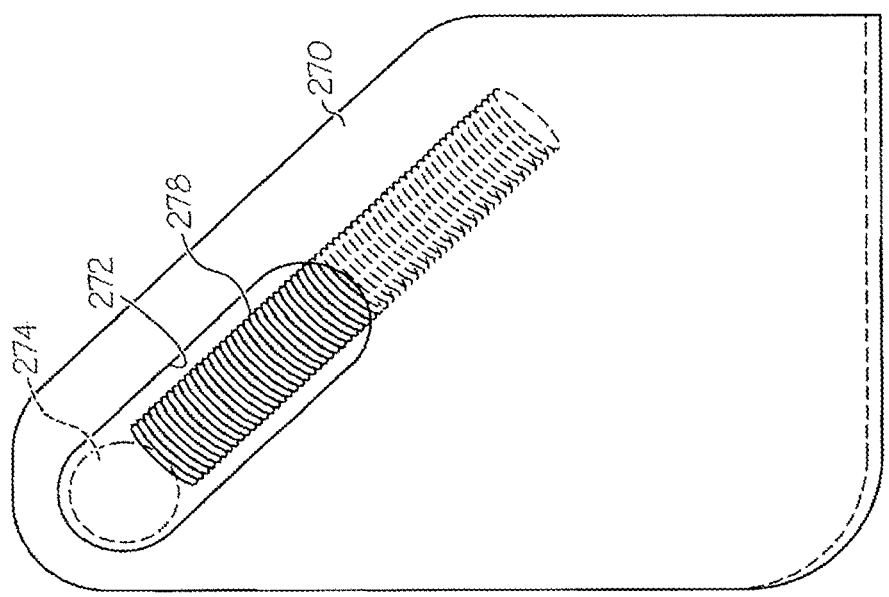
FIG. 10J is a detail of a crank arm of the embodiment of FIG. 10A.
Figure 10K:
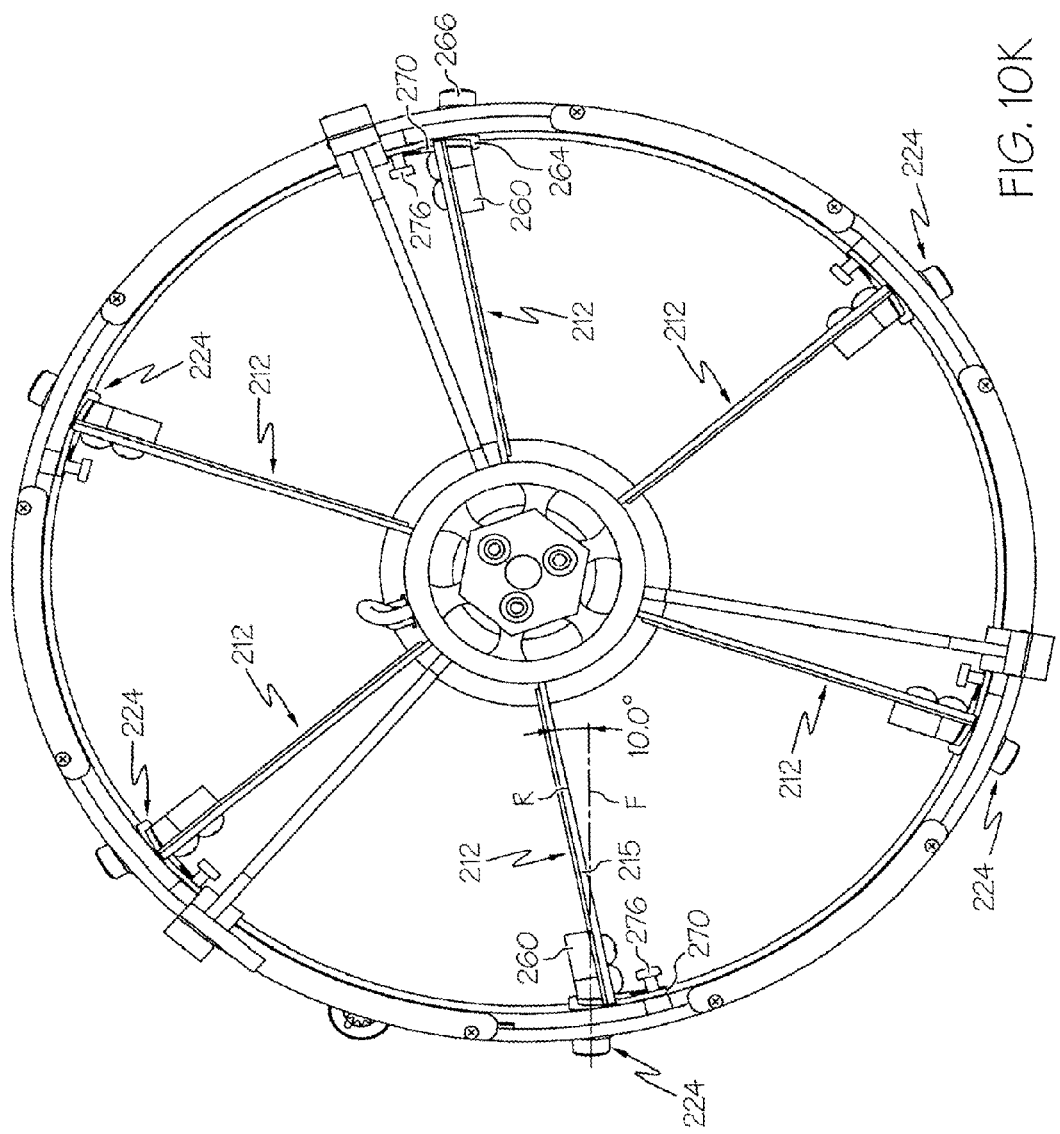
FIG. 10K is a plan view of the filter of FIG. 10A, showing a filter element pivot angle.

Similarly, the holes 268 are oriented such that the pivot axes F may be angled obliquely (i.e., having an offset angle) relative to a radius R in the composite filter plane as shown in FIG. 10K. In one aspect, the pivot axes F may be angled 10° relative to the plane P and 10° to the radius R. In one aspect the inclination angle and oblique or offset angle made by pivot axes F may be approximately equal to each other. This will ensure that when pivoted to an open position as shown in FIG. 10K, the filter elements 212 will be oriented substantially vertically (i.e., substantially perpendicular to the composite filter plane P and substantially parallel to emitted radiation from the illumination device 102 (FIG. 3A)), and each filter will be oriented substantially along a radius R relative to the inner and outer peripheral support rings 233, 234. This may provide the advantage of orienting the filter elements 212 when in the open position such that they obstruct a minimal amount of light (or other electromagnetic radiation) emitted by the associated searchlight 101 (see FIG. 1). Another advantage of offsetting the pivot axes F in the aforementioned manner is that it provides clearance between the frames 213 of the filter elements 212 and the inner surface of the reflector 204 when the filter elements are pivoted to the open position, as shown in FIG. 10G.

As shown in FIGS. 10B, 1010E, 10J and 10L, Each pivot 224 may include a crank arm 270 that may be attached to and extend from the flange 260. The crank arm 270 may include an elongate slot 272 shaped to receive the shank 274 of an actuation pin 276 that is threaded into inner peripheral support ring 233. As shown in FIG. 10J, each crank arm 270 may include a compression spring 278 that is attached to the crank arm at a lower end (as shown in the FIG. 10J) by means such as a pin or projection (not shown), and whose upper end urges against the shank 274 of the actuation pin 276 (FIG. 10B). The force exerted by the spring 278 will ensure that the filter elements 212 are held fully closed (FIG. 10B) or fully open (FIG. 10L).

As shown in FIGS. 10A, 10D, 10E and 10H, the inner peripheral support ring 233 is concentric with, and is shaped to rest upon, an annular ledge 280 of outer peripheral support ring 234 (see FIGS. 10B and 10H). The outer peripheral support ring 234 is mounted on and is fixed relative to the reflector dish 204. The inner peripheral support ring 233 may be retained in engagement with ledge 280 by retaining plates 282 that may be attached to the outer peripheral support ring 234 by screws 284. Thus, the inner peripheral support ring 233 is captured by the retaining plates 282 and is capable only of rotational motion relative to outer peripheral support ring 234.

As shown in FIGS. 10E and 10F, the filter 200 may include an actuator motor 250 having an output shaft 284 connected to a spur gear 286. The spur gear 286 may mesh with a rack 288 formed in the outer periphery of the inner support ring 233. The output shaft 284 may extend through an opening (not shown) formed in the outer peripheral support ring 234, and the spur gear 286 may be received in a cutout 290 formed in the outer support ring. The actuation motor 250 may be mounted on the reflector 204 (not shown), as is the outer peripheral support ring 234 (see FIGS. 10H and 10I, for example), or may be mounted on the housing 106 (see FIG. 2A), or any component of the searchlight 100 that is fixed relative to the outer support ring. Rotation of the spur gear 286 by actuation motor 250 will cause the inner support ring to rotate clockwise or counter-clockwise relative to outer peripheral support ring 234. The travel of the inner support ring 233 relative to the outer peripheral support ring 234 may be controlled by limit switches (not shown), or a controller (not shown).

The operation of the filter 200 is as follows, As shown in FIGS. 10A, 10B and 10C, when the filter 200 is in the closed position, the filter elements 212 are substantially planar, lying in the composite filter plane P, and the frames 213 thereof may lie in an overlapping relation. The flanges 260 may be generally co-planar with the filter elements 212 and the crank arms 270 of the pivots 224 may be oriented as shown in FIGS. 10B and 10C. In this configuration, the filter elements 212 substantially cover the exit opening of the reflector 204 so that substantially all emitted radiation from the associated searchlight 101 passes through the filter elements.

To adjust the filter 200 to an open position, the actuator motor 250 is actuated to rotate spur gear 286 (FIG. 10F) to rotate inner peripheral support ring 233 counterclockwise, as shown in FIGS. 10A and 10E. This relative rotation causes the shank 274 of the actuation pin 276 to move relative to the outer peripheral support ring 234 and rotate the crank arm 270, mounting screw 266 and inner race of the bearing 264 clockwise in the direction of the dotted arrow in FIG. 10C about the outer race of the bearing. This rotation of the crank arm 270 causes the flange 260 to which it is attached to rotate, thus rotating the filter element 212 attached to the flange. Rotation of the filter elements 212 along their respective axes F in this manner stops when the rotation of the inner peripheral support ring 233 has reached its maximum travel.

At that point, as shown in FIG. 10L, each crank arm 270 of the filter 200 has pivoted clockwise to the point where the filter element 212 attached to it is oriented substantially vertically, as shown in FIGS. 10K and 10L, which is perpendicular to plane P of FIG. 10I. Because of the inclination of the pivot axes F relative to the composite filter plane P, the radially outer walls of the frames 213 are angled away from the inner wall of the reflector 204, as shown in FIG. 10G. During the pivoting movement of the crank arm 270, the shank 274 travels within the slot 272 since the crank arm 270 travels in an arcuate path, whereas the shank 274 of the actuation pin 276 travels in a substantially linear motion in a plane parallel to the composite filter plane P.

To pivot the filter elements 212 from the open position, shown in FIGS. 10D and 10K, to the open position shown in FIG. 10A, the process is reversed. The actuator motor 250 is actuated to rotate the spur gear 286 in the opposite direction, thereby rotating the inner support ring 233 clockwise, as viewed in FIG. 10D. The rotation of the inner peripheral support ring 233 causes the crank arm 270 to pivot the flange 260, and the attached filter element 212, about the pivot axis F for each filter element 212 of the composite filter 211. Pivoting movement of the filter elements 212 may stop when the filter elements are oriented substantially perpendicular to composite filter plane P, which may be parallel to the radiation emitted from the searchlight 101.

Other actuating assemblies for effecting relative rotation of the outer peripheral support ring 134 may be employed without departing from the scope of the invention. For example, the actuator motor drive pulley may be replaced with a spur gear that engages and drives a ring gear fitted about the outer periphery of the outer peripheral support ring 134.

While the methods and forms of apparatus disclosed herein may constitute preferred aspects of the disclosed filter, it is to be understood that the invention is not limited to these precise forms and methods, and that changes may be made therein without departing from the scope of the invention.

What is claimed is:

1. For use with an illumination device of a type having a reflector with an exit opening, an illumination source mounted within the reflector, and a housing that encloses the illumination source and the reflector, the reflector shaped to direct radiation emitted from the illumination source through the exit opening, a filter comprising:
   an inner support having a central lamp shield for engaging an electrode of the illumination source;
   an outer support having an inner peripheral ring and an outer peripheral support ring, the outer peripheral support ring fixed relative to the central lamp shield and shaped to be attached to the housing;
   a composite filter having a plurality of filter elements, each of the filter elements configured to pivot about an associated, radially extending pivot axis extending from a common origin, and extending between and attached to the central lamp shield and the outer support, wherein the outer peripheral support ring receives outer ends of the filter elements for pivoting about the pivot axes, and wherein the inner peripheral support ring is connected to the outer ends of each of the filter elements so that rotation of the inner peripheral support ring relative to the outer peripheral support ring causes the filter elements pivot about the pivot axes, the filter elements being shaped and positioned to substantially cover the reflector opening to filter the emitted radiation passing through the reflector opening when pivoted to a closed position by rotation of the inner peripheral support ring relative to the outer peripheral support ring, and to allow the emitted radiation to pass substantially unfiltered through the reflector opening when pivoted to an open position by rotation of the inner peripheral support ring relative to the outer peripheral support ring; and
   an actuator connected to pivot the filter elements to the closed position and to the open position by rotating the inner peripheral support ring relative to the outer peripheral support ring.

2. The filter of claim 1, wherein the filter elements are substantially wedge shaped and attached to the inner support and the outer support such that the plurality of filter elements each pivots about a radial axis extending between the inner support and the outer support.

3. The filter of claim 2, wherein each of the filter elements overlaps a portion of an adjacent filter element when the filter elements are pivoted to the closed position.

4. The filter of claim 1, wherein the plurality of filter elements are oriented substantially parallel to the radiation emitted from the illumination device when pivoted to the open position; and wherein the plurality of filter elements are oriented substantially perpendicular to the radiation emitted from the illumination device when the filter elements are pivoted to the closed position.

5. The filter of claim 1, wherein the pivot axis of each of the filter elements is angled obliquely relative to a radius in a plane of the composite filter.

6. For use with an illumination device of a type having a reflector having an exit opening, an illumination source mounted within the reflector, and a housing that encloses the illumination source and the reflector, the reflector being shaped to direct radiation emitted from the illumination source through the exit opening, a filter comprising:
   an inner support having a central lamp shield for engaging an electrode of the illumination source;
   an outer support having an inner peripheral ring and an outer peripheral support ring, the outer peripheral support ring fixed relative to the central lamp shield, and the outer support shaped to fit over a periphery of the exit opening;
   a composite filter having a plurality of filter elements, each of the filter elements configured to pivot about an associated, radially extending pivot axis extending from a common origin, and extending between and attached to the central lamp shield and the outer support;
   a plurality of pivots attaching the filter elements to the outer peripheral support ring and the inner peripheral support ring, the filter elements being shaped and positioned to lie in a composite filter plane and substantially cover the exit opening to filter the emitted radiation passing through the exit opening when pivoted to a closed position by rotation of the inner peripheral support ring relative to the outer peripheral support ring, and to rotate about the pivots from the composite filter plane to allow the emitted radiation to pass substantially unfiltered through the exit opening when pivoted to an open position by rotation of the inner peripheral support ring relative to the outer peripheral support ring; and
   an actuator connected to pivot the filter elements to the closed position and to the open position by rotating the inner peripheral support ring relative to the outer peripheral support ring.

7. The filter of claim 6, wherein at least one of the pivots is attached to the outer support to pivot an attached one of the filter elements about an axis that is inclined at an angle relative to the composite filter plane when the filter elements are in a closed position, whereby the inclination provides clearance between the attached one of the filter elements and the reflector housing when the filter is mounted on the illumination device.

8. The filter of claim 7, wherein the axis of the at least one of the pivots is offset from a radius in the composite filter plane.

9. The filter of claim 8, wherein the offset of the axis of the at least one of the pivots is at an angle that is approximately equal to the inclined angle of the axis relative to the composite filter plane, whereby the one of the filter elements is oriented substantially parallel to the emitted radiation from the illumination source when in the open configuration.

10. The filter of claim 9, wherein the offset angle and the inclination angle each are approximately 10 degrees.

11. The filter of claim 6, wherein the outer support includes an inner peripheral support ring and an outer peripheral support ring; and the pivots are pivotally attached to the inner peripheral support ring.

12. The filter of claim 11, further comprising an inner support, the inner support including a central lamp shield attached to the outer peripheral support ring.

13. The filter of claim 12, further comprising a reflector housing enclosing the reflector and illumination source; and wherein one of the inner and outer peripheral support rings is adapted to be attached to the reflector housing.

14. The filter of claim 13, wherein the outer peripheral support ring is fixed to the central lamp shield.

15. The filter of claim 14, wherein the inner peripheral support ring is rotatably mounted on the outer peripheral support ring and is concentric therewith.

16. The filter of claim 6, wherein the outer support includes an outer peripheral support ring, an inner peripheral support ring, and an actuator attached to rotate the inner peripheral support ring and the outer peripheral support ring relative to each other to pivot the plurality of filter elements.

17. A method for selectively filtering radiation from an illumination device of a type having a reflector with an exit opening, an illumination source mounted within the reflector, and a housing that encloses the illumination source and the reflector, the reflector shaped to direct the radiation emitted from the illumination source through the exit opening, the method comprising:
   attaching an outer support to a periphery of the exit opening, the outer support having an inner peripheral support ring and an outer peripheral support ring, the outer peripheral support ring fixed relative to the housing;
   providing an inner support concentric with the outer support, the inner support fixed relative to the outer peripheral support ring;
   placing a filter over the opening, the filter including a composite filter having a plurality of filter elements extending between and pivotally attached to the inner support and the inner peripheral support ring and outer peripheral support ring of the outer support, the filter elements being shaped and positioned to substantially cover the exit opening to filter the emitted radiation passing through the exit opening when pivoted to a closed position by rotation of the inner peripheral support ring relative to the outer peripheral support ring, wherein a first band or type of electromagnetic radiation from the illumination source is blocked, and to allow the emitted radiation to pass substantially unfiltered through the exit opening when pivoted to an open position by rotation of the inner peripheral support ring relative to the outer peripheral support ring; and
   selectively actuating the filter to pivot the filter elements to the closed position and to the open position by rotation of the inner peripheral support ring relative to the outer peripheral support ring.

18. The method of claim 17, wherein providing an inner support includes providing an inner support that also supports a cathode of the illumination source.

19. The method of claim 17, wherein selectively actuating the filter to pivot the filter elements to the closed position includes substantially blocking the first band or type of electromagnetic radiation by the plurality of filter elements while allowing a second band or type of electromagnetic radiation to pass through the plurality of filter elements.

20. The method of claim 17, wherein placing a filter over the opening includes placing a plurality of filter elements made of materials different from each other, whereby the filter may be comprised of filter elements made of different materials blocking and allowing to pass different bands or types of electromagnetic radiation.

\* \* \* \* \*